(12) United States Patent
Fukazawa et al.

(10) Patent No.: US 8,486,494 B2
(45) Date of Patent: Jul. 16, 2013

(54) ORGANIC/INORGANIC COMPOSITE COATING FILM, STRUCTURAL COLOR FILM USING THE SAME, AND PREPARATION METHODS THEREOF

(75) Inventors: Norimasa Fukazawa, Sakura (JP); Ren-Hua Jin, Sakura (JP)

(73) Assignees: Kawamura Institute of Chemical Research, Sakura-shi (JP); DIC Corporation, Tokyo (JP)

( * ) Notice: Subject to any disclaimer, the term of this patent is extended or adjusted under 35 U.S.C. 154(b) by 609 days.

(21) Appl. No.: 12/530,903

(22) PCT Filed: Mar. 6, 2008

(86) PCT No.: PCT/JP2008/054044
§ 371 (c)(1),
(2), (4) Date: Sep. 11, 2009

(87) PCT Pub. No.: WO2008/120529
PCT Pub. Date: Oct. 9, 2008

(65) Prior Publication Data
US 2010/0104810 A1 Apr. 29, 2010

(30) Foreign Application Priority Data
Mar. 14, 2007 (JP) ................. 2007-064983

(51) Int. Cl.
*B32B 3/26* (2006.01)
*B05D 3/10* (2006.01)
(52) U.S. Cl.
USPC ...... 427/385.5; 428/147; 428/145; 428/304.4
(58) Field of Classification Search
USPC ................ 428/147, 304.4, 145; 427/385.5
See application file for complete search history.

(56) References Cited

U.S. PATENT DOCUMENTS

| 2002/0024163 A1 | 2/2002 | Fu et al. |
| 2003/0116747 A1 | 6/2003 | Lem et al. |
| 2004/0198882 A1* | 10/2004 | Fujita .................. 524/261 |

FOREIGN PATENT DOCUMENTS

| JP | 11-038202 A | 2/1999 |
| JP | 2000-021245 A | 1/2000 |
| JP | 2000-233999 A | 8/2000 |
| JP | 2002-030113 A | 1/2002 |
| JP | 2002-105146 A | 4/2002 |
| JP | 2002-241448 A | 8/2002 |

(Continued)

OTHER PUBLICATIONS

Chan et al. "Self-assembled free standing colloidal crystals", Nanotechnology 16 (2005) 1440-1444, vol. 16, No. 9, Sep. 2, 2005.*

(Continued)

*Primary Examiner* — Satya Sastri
(74) *Attorney, Agent, or Firm* — Edwards Wildman Palmer LLP; James E. Armstrong, IV

(57) ABSTRACT

An organic/inorganic composite coating film comprising an inorganic material as a matrix and an organic material combined therewith. The coating film has a regular hollow structure therein, and the coating film surface has a rugged pattern with semispherical protrusions. Also provided is a large-area structural color film obtained by burning the composite coating film. The organic/inorganic composite coating film is obtained by applying an aqueous coating composition comprising a metal alkoxide, an aqueous dispersion of monodisperse polymer particles, and an acid catalyst to a substrate and curing the coating composition. Burning the organic/inorganic composite coating film gives the structural color film.

6 Claims, 9 Drawing Sheets

FOREIGN PATENT DOCUMENTS

| | | | |
|---|---|---|---|
| JP | 2004-131539 | A | 4/2004 |
| JP | 2004-262151 | A | 9/2004 |
| JP | 2004-300311 | A | 10/2004 |
| JP | 2005-047209 | A | 2/2005 |
| JP | 2005-516235 | A | 6/2005 |
| JP | 2006-213534 | A | 8/2006 |
| JP | 2006-291089 | A | 10/2006 |
| JP | 2007-197305 | A | 8/2007 |
| JP | 2007-277792 | A | 10/2007 |
| JP | 2008-007747 | A | 1/2008 |
| WO | 2006/011512 | A1 | 2/2006 |

OTHER PUBLICATIONS

M. Hildebrand., Biological processing of nanostructured silica in diatoms, Progress in Organic Coatings, 2003, p. 256-266, vol. 47.

N. Poulsen et al., Biosilica formation in diatoms: Characterization of native silaffin-2 and its role in silica morphogenesis, Proc. National Academy of Sciences of the USA., 2003, p. 12075-12080, vol. 100.

Don Jin Kim et al., Biomimetic Formation of Silica Thin Films by Surface-Initiated Polymerization of 2-(Dimethylamino)ethyl Methacrylate and Silicic Acid, Langmuir, 2004, p. 7904-7906, vol. 20.

B. T. Holland et al., Synthesis of Macroporous Minerals with HigWy Ordered Three-Dimensional Arrays of Spheroidal Voids, 1998, p. 538-540, vol. 281.

T. Yoshida, "Catchball between Polymer Science and Inorganic Chemistry" Recent Developments in Organic-Inorganic High Complexing Techniques by Precision-Orientated "Sol-Gel Methods", Project of Event Committee of the Society of Polymer Science, Japan, first edition and first printing, Mar. 9, 2001, p. 63.

Chan et al. "Self-assembled free standing colloidal crystals," Nanotechnology 16 (2005) 1440-1444, vol. 16, No. 9, Sep. 2, 2005.

Extended European Search Report, issued in European Patent Application No. 08721464.9, dated Feb. 20, 2013.

Chan et al. "Self-assembled free standing colloidal crystals," Nanotechnology 16 (2005) 1440-1444, vol. 16, No. 9, Jun. 29, 2005.

\* cited by examiner

ORGANIC/INORGANIC COMPOSITE COATING FILM, STRUCTURAL COLOR FILM USING THE SAME, AND PREPARATION METHODS THEREOF

CROSS REFERENCE TO RELATED APPLICATIONS

This is the U.S. national phase application under 35 U.S.C. §371 of International Patent Application No. PCT/JP2008/054044, filed Mar. 6, 2008, which claims the benefit of Japanese Application No. 2007-064983, filed Mar. 14, 2007, both of which are hereby incorporated by reference in their entireties. The International Application was published on Oct. 9, 2008 as International Publication No. WO/2008/120529 A1 under PCT Article 21(2).

TECHNICAL FIELD

The present invention relates to an organic/inorganic composite coating film, which includes an organic material combined with a matrix including an inorganic material, wherein the coating film has a spherical regular hollow structure therein and a semispherical regular peak-valley surface profile, and to a method for preparing the same. Further, the present invention relates to a structural color film with a large area having no defects, obtained by calcination of the organic/inorganic composite coating film, and to a method for preparing the same.

BACKGROUND OF THE INVENTION

An intense interest has been paid to a coating film in which a continuous phase is formed of an inorganic material such as a metal oxide and the like as a next generation coating material, because the coating film has high hardness and flame retardancy which cannot be achieved by a coating film in which a continuous phase is formed of an organic material. Further, in addition to these characteristics, such an inorganic coating film has excellent solvent resistance, light resistance, weather resistance, and the like, and can also be provided with functions such as superhydrophilicity, superhydrophobicity, antistaticity, and the like. Therefore, its application is greatly anticipated.

As the inorganic coating film, a coating film in which a continuous phase is formed of metal oxide formed by a sol-gel reaction has been widely studied. In particular, these metal oxide coating films having a regular structure inside and outside the coating film are mostly a organic/inorganic composite coating film, wherein an organic polymer is hybridized in a matrix of a metal oxide. These originate from the study of a biosilica. That is, in a recent study of the biosilica, it was found that the cell membrane of diatoms is basically composed of silica, and that the silica cell membrane has an extremely precise pattern from nanoscale to micron-scale. It has been also found that polyamines are highly associated with the derivation of the pattern (see M. Hildebrand, Progress in Organic Coatings, 2003, Vol. 47, p. 256-266). If such a precise pattern of the biosilica can be realized in the inorganic coating film, it becomes highly possible to construct the coating film with various devices such as a biosensor, an optical material, an electronic material, a functional catalyst material, and the like. Therefore, an inorganic material having a precise pattern or a spontaneous pattern formation without processing the inorganic material has been studied. Further, since if an organic/inorganic composite coating film which is robust and has a precise pattern is calcined at a high temperature, only the organic compound is removed while maintaining the precise pattern, and therefore, it is believed that if the pattern can be controlled, it is also possible to obtain a material having a structural color including an inorganic material.

For example, a silica block having numerous holes on the surface and a diameter of several hundred nanometers or more, which is prepared by using a biomolecule isolated from a biosilica has been disclosed (see N. Poulsen et al., Proc. Natl. Acad. Sic. USA, 2003, Vol. First 100, p. 12075-12080). The silica block has holes on the surface, but the holes have more or less different diameters, and thus the patterns are not controlled.

Furthermore, there has been reported that a composite film of silica and an organic polymer has been obtained by fixing a molecule having a polymerization initiation ability onto the surface of gold, polymerizing a polymerizable monomer having an amino group to form a number of amine polymers on the surface of the gold in the form of a brush, and then performing a hydrolysis/condensation reaction of an alkoxysilane on the amine polymer brush (see Don Jin Kim et al., Langmure, 2004, Vol. 20, p. 7904-7906). The surface of the composite coating film thus obtained did not have a flat structure, but had a fine peak-valley structure on a nanometer scale. However, the irregular peak-valley structure was formed from the aggregation of silica particles, and its surface shape was formed at random and therefore, a precise pattern was not formed thereon.

As a method for obtaining an organic/inorganic composite coating film having holes formed on the flat film surface, a method for applying a coating composition including an aqueous polymer having a polyamine segment and a metal alkoxide has been disclosed (see, for example, WO 2006/011512 ("WO '512")). The pore diameter or depth of the holes of the coating film surface depends on the structure, molecular weight, or the like, of the aqueous polymer used as a material. Accordingly, in the case where the obtained coating film is used for fixing a functional compound, it is necessary to form a hole corresponding to the functional compound, and therefore, it is necessary to make various studies on the structure and the like of the aqueous polymer. Furthermore, in the case where a compound having a fluorescence or a coloring property is introduced to a water soluble polymer so as to provide the coating film with a new function, the shape of the formed hole changes, and therefore, it is insufficient for general applicability. Further, since the coating film does not have a hollow structure therein and the aqueous polymers are not regularly arranged, the color of the metal oxide only is developed even after calcination of the coating film, and accordingly, the structural color is not developed.

In addition, it has been disclosed that an organic/inorganic composite coating film having a uniform distribution of the core-shell particles in the coating film is obtained by applying a coating composition including a water dispersible core-shell particle having an amino group-containing polymer as a shell layer and a silane compound (see, for example, JP-A-2006-291089 ("JP '089")). The coating film forms a dense hybrid structure having a polymer particle interface and a silica matrix. However, the holes are not formed on the film surface, nor do they have a hollow structure therein. Therefore, in the case of having the functional compounds in combination in order to provide various functions for the composite coating film thus obtained, the amino group on the core-shell particle surface is modified. As a result, the sol-gel reaction of the silane compound is affected, and correspondingly, the physical properties of the organic/inorganic composite coating film thus obtained are also affected, which limits the range of applications. Moreover, even though the coating film is burned to remove the core-shell particles, the particles are not regularly arranged, and therefore, the structural color is not developed.

On the other hand, a method for obtaining a coating film having a structural color, has been proposed, for example, a technology in which other materials are interpenetrated and charged in the void in a fine particle array film using the fine particle array film as a template (cast), and then the fine particles are removed to form a periodically porous structure, which is used as a structural color film. For example, a colloidal crystal is prepared by the suction filtration of a dispersion of fine particles of polystyrene, and a solution of a metal alkoxide is dropped thereon and penetrated between the fine particles. The method in which by calcination of this, a continuous form of a structure of metal oxide between fine particles is formed, and thereafter, the polystyrene is removed to prepare an inverse opal structure (for example, see Brian T. Holland et al., "Science", Vol. 281, 1998, p. 538-540 ("Holland")), or the like has been disclosed.

However, in the method of Holland, there has been a problem that after the preparation of the colloidal crystal, the metal alkoxide is packed in the densely packed and very narrow void of the particles, and thus, when the void portion of the surface is packed with these materials, nothing can penetrate thereinto, and therefore, the void between the particles is not sufficiently packed, thereby giving an inhomogeneous periodic structure. In addition, since the surplus metal alkoxide, which is not packed, forms a continuous body having no periodic structure by calcination, this case suffers a problem that a non-uniform material having a portion showing a periodic structure and a portion not showing a periodic structure in the mixture is provided. Further, since a part of a three dimensional periodic structure having an inverse opal structure uses a template having particles coming in contact with each other, a fragile structure having pores connected at the contact points is formed, thereby causing the generation of cracks from the shrinkage involved with calcination. Thus, it is difficult to maintain the structure. The problems with the inhomogeneity and the strength get more serious as the size of the material increases, and accordingly, it is basically difficult to prepare a structural color film with a large area.

In order to solve the problems with the inhomogeneity and the strength, the present inventors have already disclosed a technology involving adding a metal alkoxide to a sol, in which a core-shell particle having a fine particle as a core portion and a crosslinked hydrophilic organic polymeric compound as a shell portion is dispersed in water or a hydrophilic solvent, to conveniently prepare a three dimensional periodic structure having the organic material and the inorganic material combined therewith by a sol-gel reaction of the alkoxide, and burning the structure to remove the organic component, thereby obtaining a periodic structure having an inverse opal structure comprising a metal oxide (see JP-A-2006-213534 ("JP '534")). Since this technology uses a crosslinked shell layer having a certain thickness which forms a hydrogel as a reaction field of a sol-gel reaction while not drying a film having the fine particles arranged therein, a layer of a metal oxide which is uniform between the particles and has a sufficient thickness can be easily formed. By this, there is no contact between adjacent pores and a rigid inverse opal structure can be obtained, and therefore, it becomes possible to obtain a three dimensional periodic porous structure which is relatively larger than ones formed using a conventional method.

In the method proposed in JP '534, a dispersion sol of the core-shell particles is applied on a substrate, and immersed in a metal alkoxide to proceed a sol-gel reaction in the shell layer, and fix the array of the core-shell particles. Accordingly, the usable substrate is limited to a material which is stable to the metal alkoxide. Moreover, since a step for dipping the entire substrate is involved, it is necessary to prepare a large dipping tank adapted for the size of the substrate in order to obtain a large-scale structural color film. Further, it is necessary to prepare a large amount of the metal alkoxide in order to fill the large-scale dipping tank. As seen from this, the preparation method proposed in JP '534 had a problem related to practical use to still be solved. Further, the three dimensional periodic structure including a core shell type fine particle prepared on a substrate by such a method forms a three dimensional periodic structure of a strong organic/inorganic composite by a sol gel reaction in the shell layer, but a strong adhesion with the substrate based on a covalent bond does not originally exist. Accordingly, when a large structural color film is prepared, there may be a case of peeling from the substrate with the progress of the sol-gel reaction or a case of peeling from the substrate upon calcination. In the case of peeling off the film as above, a local stress is applied, and as a result, the obtained structural color film is folded or wound, and thus cracks are easily generated in the film. Therefore, it is difficult to obtain a structural color film or a structural color coating on substrate.

As such, an organic/inorganic composite coating film having a robust structure, in which the internal porous structure and a surface pattern structure are highly controlled at the same time, has not been realized yet. Accordingly, a structural color film with a large area and having no defects, cracks, or the like, from which the organic/inorganic composite coating film will be obtained by calcination, has not been found.

It is a problem solved by the present invention to provide an organic/inorganic composite coating film comprising an organic material combined with a matrix comprising an inorganic material, wherein the coating film has a periodic porous structure therein, and the coating film surface has a semi-spherical peak-valley surface profile on the surface, a method for conveniently preparing the composite coating film, and a structural color film with a large area obtained by burning the composite coating film.

SUMMARY OF THE INVENTION

In order to solve the above-described problems, the present inventors have made extensive studies, and as a result, they have found that the hollow polymer particles constitute a sol which is stable with a metal alkoxide in an aqueous medium, that a continuous phase of the metal oxide is formed by a sol-gel reaction accompanied by evaporation of the volatile components when the sol is coated on a substrate, that a close packed array of the hollow polymer particles is generated during the process, and the sol of the metal oxide is thus cured to obtain an organic/inorganic composite coating film having a periodic structure on the substrate, and that a structural color film showing bright color is obtained when the obtained organic/inorganic composite coating film is calcined together with a substrate or peeled off from the substrate. Based on this, they have completed the present invention.

That is, the present invention is intended to provide a method for preparing an organic/inorganic composite coating film, which includes coating an aqueous coating composition comprising a metal alkoxide, an aqueous dispersion of monodisperse hollow polymer particles, and an acid catalyst on a substrate, and then curing it, and an organic/inorganic composite coating film obtained by the method, wherein a regular porous structure in which hollow polymer particles are colse packed in a three dimensional space in a matrix comprising a metal oxide obtained by a sol-gel reaction of the metal alkoxide occurs.

Furthermore, the present invention is intended to provide a structural color film showing bright color by calcination of the obtained organic/inorganic composite coating film together with the substrate or after peeled off from the substrate, and a method of preparing the same.

The composite coating film having an internal hollow structure and an peak-valley surface pattern, in which the matrix is formed of a metal oxide obtained by a sol-gel reaction, enables a conductive metal line to be constructed on the pattern surface, in addition to the semiconductor properties of the material itself, and can be expected to be applied to the field of a number of advanced materials, such as a biosensor, a fixation of biomolecules/catalysts, dye-sensitized solar cells, luminescent materials due to optical interference, construction of a superhydrophobic or superhydrophilic coating film, and the like in future.

Furthermore, the method for preparing the structural color film of the present invention is a method for easily preparing a structural color film having no defect and having a three dimensional, internal regular porous structure in any of the shapes on a variety of solid substrate, such as glass, a metal, a metal oxide, and the like, and further, it enables a self-standing film as well as a film on a substrate to be obtained. The structural color film of the present invention thus obtained or the substrate coated with the structural color film has neither cracks nor defects even though it has a large area, and shows uniform and clear color development. Accordingly, it can be suitably used in the field of design/craft, decoration, and the like. Further, it can be applied to a number of fields of photonic crystals using an optical interference action, various sensors, counterfeit prevention coatings, fixation of a biomolecular/catalyst using a porous structure, dye-sensitized solar cells, fuel cells, construction of a superhydrophobic or superhydrophilic surface, heat insulation, sound insulation material, and the like.

DETAILED DESCRIPTION OF THE INVENTION

Figure 1:
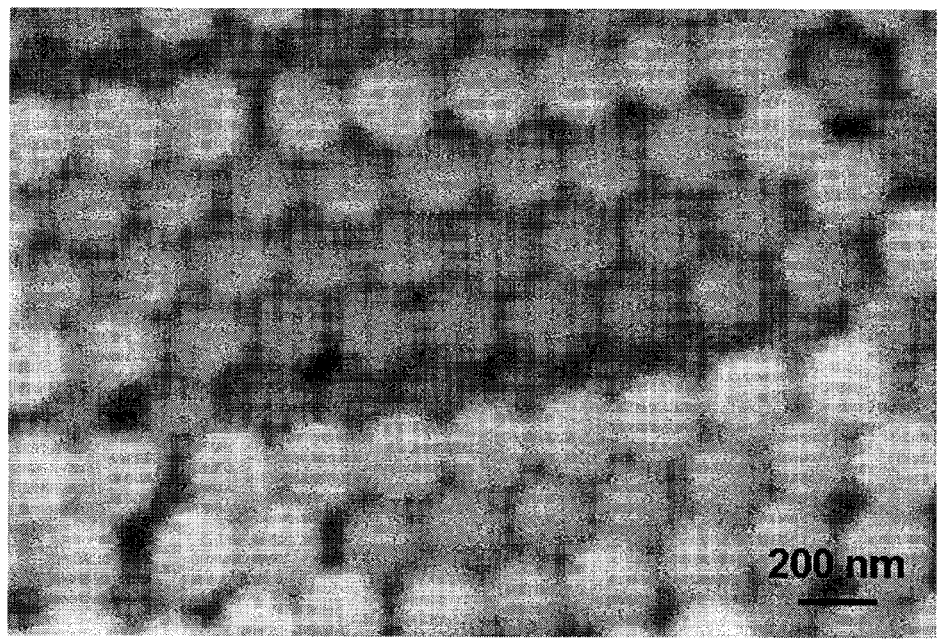
FIG. 1 is an SEM observation image showing the form of the hollow polymer particle obtained in Synthesis Example 1.

The organic/inorganic composite coating film of the present invention is characterized in that a monodisperse hollow polymer particle is combined in a matrix comprising a metal oxide including silica and an oxide of silicon. The matrix comprising a metal oxide refers to a structure in which a continuous phase of the metal oxide material is constructed over the entire coating film. Further, the monodisperse means that the variance coefficient of the particle diameter of the hollow polymer particle is equal to or less than 0.1.

Metal Oxide (A') and Metal Alkoxide (A)

The metal oxide (A') in the organic/inorganic composite coating film of the present invention is one obtained by a sol-gel reaction of the metal alkoxide (A). As the metal alkoxide (A), a trivalent or higher metal alkoxide capable of hydrolysis is preferably used since it can form a three dimensional network of the metal oxide (A') by hydrolysis, thereby giving a strong coating film. Particularly, in the case of using a tetravalent or higher metal alkoxide such as tetraalkoxysilane, and the like, the hardness of the obtained coating film can be increased, which is thus preferable. For the purpose of increasing the coating film hardness, in the case of using numerous metal alkoxides having a large number of functional groups, the content of the tetravalent or higher metal alkoxide in the entire metal alkoxide (A) is preferably equal to or more than 30% by mass, and more preferably equal to or more than 50% by mass.

Examples of the metal species of the metal alkoxide (A) include silicon, titanium, zirconium, aluminum, boron, germanium, zinc, and the like. Among these, silicon, titanium, zirconium, or aluminum is preferable from the viewpoint of an easy sol-gel reaction, and silicon is particularly preferable from the viewpoint of easy industrial availability.

Examples of the metal alkoxide having silicon as a metal species include an alkoxysilane which may have a reactive functional group, and the like. Further, unless otherwise specified in the present invention, the alkoxysilane include those oligomerized by a hydrolysis reaction. The oligomerized one may be used in the state of a silanolized silica sol. As the oligomerized alkoxysilane, ones having an average polymerization degree of 2 to 20 can be suitably used. In this case, as the catalyst used for the hydrolysis reaction, various acids or alkalis can be used.

Examples of the alkoxysilane include dialkoxysilanes such as dimethyldimethoxysilane, diethyldimethoxysilane, methylethyldimethoxysilane, diphenyldimethoxysilane, phenyl methyldimethoxysilane, and the like, trialkoxysilanes such as methyltrimethoxysilane, ethyltrimethoxysilane, propyltrimethoxysilane, phenyltrimethoxysilane, γ-glycidoxypropyltrimethoxysilane, γ-methacryloylpropyltrimethoxysilane, γ-(2-aminoethyl)aminopropyltrimethoxysilane, methyltriethoxysilane, phenyltriethoxysilane, and the like, tetraalkoxysilanes such as tetramethoxysilane, tetraethoxysilane, tetra (2-ethanol) orthosilicate, tetra(n-propoxy)silane, tetra (isopropoxy)silane, and the like, and others.

Furthermore, examples of the alkoxysilane having a functional group, for example, silanes having halogen, include chlorosilane such as tetrachlorosilane and methyltrichlorosilane, and others.

Examples of the metal alkoxide having titanium as a metal species include an alkoxytitanium such as titanium tetraisopropoxide, titanium tetraethoxide, titanium tetrabutoxide, titanium tetrapropoxide, and the like, and further, various titanium chelates prepared from a metal alkoxide of titanium, such as titanium acetylacetonate, titanium octylene glycol, titanium tetraacetylacetonate, titanium ethyl acetate, and the like may be used. Examples of the metal alkoxide having aluminum as a metal species include alkoxyaluminums such as triethoxyaluminum, and the like.

These metal alkoxides (A) may be used singly or in combination of two or more kinds thereof. In order to increase the hardness of the obtained composite coating film, the ratio of the metal alkoxide having a metal species other than silane, such as a bivalent or less alkoxysilane, alkoxytitanium, alkoxyaluminum, and the like to be used is preferably equal to or less than 10% by mass of the entire metal alkoxide (A).

Hollow Polymer Particle (B)

The hollow polymer particle (B) used in the organic/inorganic composite coating film of the present invention can be combined with the above-described metal oxide (A'), and thus, it may be required to be monodisperse. In particular, it is preferable that it has a hydrophilic surface and is stably dispersed in an aqueous medium. Further, the hollow polymer particle having a small shell wall is preferred since it easily forms a porous structure inside the obtained organic/inorganic composite coating film and a peak-valley structure on the surface. From the viewpoint that such a hollow polymer particle is easily obtained, it is most preferable to obtain the hollow polymer particle by carrying out a pseudoemulsion type radical polymerization reaction of a radical polymerizable water soluble monomer (b1) and a radical polymerizable water-insoluble monomer (b2) in an aqueous medium.

When a monomer group containing the radical polymerizable water soluble monomer (b1) and the radical polymerizable water-insoluble monomer (b2) are copolymerized in an aqueous medium, the water soluble monomer (b1) has an extremely low molar concentration in the aqueous medium, relative to that of the water-insoluble monomer (b2). If the polymerization is carried out using a water soluble initiator as such, the water soluble monomer (b1) is preferentially polymerized, and thus, a hydrophilic segment derived from the monomer (b1) is then formed. On the other hand, if the hydrophilic segment on the terminal radical grows to a certain size, a depletion (exhaustion) interaction between the water-insoluble monomer and the droplet is strongly induced due to factors such as the increase in a polymerization degree and the like, and as a result, there occurs a phenomenon in which a hydrophilic segment in growth is concentrated on the droplet surface. In other words, the periphery of the growth terminal of the hydrophilic segment is filled with the water-insoluble monomer (b2). Accordingly, an additional reaction of the water-insoluble monomer (b2) starts on the radical growth terminal of the hydrophilic segment and the polymerization of the water-insoluble monomer (b2) rapidly proceeds. As a result, a copolymer containing a segment having two contradictory properties is produced. A thus produced copolymer containing a hydrophobic segment and a hydrophilic segment which serves as a so-called polymeric surfactant, and during the polymerization reaction, the copolymers are assembled in a bimolecular film polymer aggregate particle (polymer vesicle) in which hydrophobic segments seem to be spontaneously sandwiched. As a result, lots of the remaining water-insoluble monomers (b2) are accepted on the film of the aggregate particle to undergo a polymerization, and ultimately, a hollow polymer particle in which both inside and outside surfaces similar to the polymer vesicle structure are hydrophilic and the thickness of the shell wall given is small. In the present invention, such a polymerization process is defined as pseudoemulsion polymerization.

The average particle diameter and the shell wall thickness of the hollow polymer particles thus obtained can be adjusted according to the purpose. In the organic-inorganic composite coating film obtained in the present invention, in order to develop the strength of the entire coating film while maintaining the hollow structure inside the coating film, the hollow polymer particles (B) are preferably those particles having a shell wall thickness equal to or more than 10 nm and equal to or less than 20 nm and an average particle diameter equal to or more than 50 nm and less than 150 nm, or those particles having a shell wall thickness equal to or more than 10 nm and equal to or less than 80 nm and an average particle diameter equal to or more than 150 nm and equal to or less than 800 nm.

The radical polymerizable water soluble monomer (b1) is not particularly limited, but those which are dissolved at an amount equal to or more than 1.0% by mass in distilled water at 25° C. are preferred, and those which are arbitrarily miscible with distilled water are more preferred. For example, those having an amide group, an amino group, an oxyalkylene chain, a cyano group, an acid anhydride group, and the like in the structure, and those having a carboxyl group, a hydroxyl group, a sulfonic acid group, a phosphoric acid group, and the like, and an alkali metal salt or ammonium salt thereof can be used. Specifically, examples thereof the water soluble monomer having an amide group include an acrylamide or an N-substituted (meth)acrylamide or N-disubstituted (meth) acrylamide such as N-ethylacrylamide, N-ethylmethacrylamide, N-isopropylacrylamide, N-isopropylmethacrylamide, N-n-propylacrylamide, N-n-propylmethacrylamide, N-cyclopropylacrylamide, N-cyclopropylmethacrylamide, N,N-dimethylacrylamide, N,N-diethylacrylamide, N,N-dimethylaminopropylacrylamide, N-methyl-N-ethylacrylamide, N-methyl-N-isopropylacrylamide, N-methyl-N-n-propylacrylamide, and the like, N-hydroxyethylacrylamide, acryloyl morpholine, N-vinylpyrrolidone, diacetone acrylamide, N,N'-methylenebisacrylamide, and the like. Examples of the water soluble monomer having an amino group include allylamine, N,N-dimethylaminoethyl acrylate, dimethylaminoethyl methacrylate, and the like. Further, examples of the water soluble monomer having a carboxyl group include acrylic acid, methacrylic acid, maleic acid, and the like, and examples of the water soluble monomer having a hydroxyl group include 2-hydroxyethyl acrylate, 2-hydroxypropyl acrylate, 2-hydroxyethylmethacrylate, 2-hydroxypropylmethacrylate, 4-hydroxybutyl acrylate, 1,4-cyclohexanedimethanolmonoacrylate, and the like. Examples of the water soluble monomer having a sulfonic acid group include styrene sulfonic acid, sodium styrene sulfonate, lithium styrene sulfonate, ammonium styrene sulfonate, ethyl styrene sulfonate ester, cyclohexyl styrene sulfonate ester, 2-acrylamido-2-methylpropane sulfonic acid, and the like. Further, a quaternized monomer that is obtained by the quaternization of a monomer synthesized by allowing an organic amine to undergo a reaction with vinyl pyridine or glycidyl methacrylate may be used.

Among these water soluble monomers (b1), those having an amide group, an amino group, a carboxyl group or a salt thereof, and a sulfonic acid group or a salt thereof in the structure are preferred from the viewpoints that they are excellent for easy industrial availability, water solubility, easy radical polymerization, and the like.

Further, it is believed that the N-substituted acrylamide or the N,N-disubstituted acrylamide has a surfactant action since it has a hydrophobic group and a hydrophilic group in one molecule. Further, the homopolymer has a specific property that the water solubility varies depending on the polymerization degree or the temperature of the aqueous medium. By these properties, the above-described reaction mechanism is easily attained, and as a result, the hollow polymer particle (B) used in the present invention can be more easily prepared.

As the radical polymerizable water-insoluble monomer (b2), various monomers can be used as long as they have a group copolymerizable with the water soluble monomer (b1). Among these, those having solubility in distilled water at 25° C. equal to or less than 0.5% by mass are preferable, and an acrylate or methacrylate is particularly preferable from the viewpoint of excellent reactivity with the water soluble monomer (b1) as well as easy industrial availability.

Examples of the acrylate include butyl acrylate, lauryl acrylate, cyclohexyl acrylate, phenyl acrylate, isobornyl acrylate, glycidyl acrylate, tert-butyl-α-trifluoromethyl acrylate, 1-adamantyl-α-trifluoromethyl acrylate, (3-methyl-3-oxetanyl)methyl acrylate, acryloylpropyltrimethoxysilane, acryloylpropyltriethoxysilane, methyl acrylate, ethyl acrylate, and the like.

Furthermore, examples of the methacrylate include methyl methacrylate, ethyl methacrylate, n-butyl methacrylate, i-butyl methacrylate, cyclohexyl methacrylate, lauryl methacrylate, stearyl methacrylate, glycidyl methacrylate, allyl methacrylate, 2,2,2-trifluoroethylmethacrylate, (3-methyl-3-oxetanyl)methylmethacrylate, methacryloylpropyltrimethoxysilane, methacryloylpropyltriethoxysilane, and the like. These radical polymerizable water-insoluble monomers (b1) may be used singly or in combination of two or more kinds thereof. Hereinafter, the (meth)acrylate as mentioned in the present specification is used as a generic term referring to an acrylate methacrylate alone or a mixture thereof unless otherwise specified.

Among the radical polymerizable water-insoluble monomers (b2) as described above, those having a cyclic ether structure such as glycidyl(meth)acrylate, oxetane (meth)acrylate, and the like can undergo an intramolecular or intermolecular cross-linking reaction while forming a copolymer with the radical polymerizable water soluble monomer (b1) or after becoming the copolymer. Since it is believed that by the crosslinking reaction, the strength of the copolymer which forms the shell portion of the obtained hollow polymer particle is increased, which contributes to the increase in the stability of the hollow polymer particle, and as a result, the above-described monomers can be particularly suitably used.

As the radical polymerizable water-insoluble monomer (b2), a bifunctional di(meth)acrylate, for example, polyethylene di(meth)acrylates such as ethylene di(meth)acrylate, diethylene(meth)acrylate, triethylene di(meth)acrylate, and the like, polypropylene di(meth)acrylates such as propylene di(meth)acrylate, dipropylene di(meth)acrylate, tripropylene di(meth)acrylate, and the like, glycerol di(meth)acrylate, and others can be used singly or in combination of two or more kinds thereof. In the case where these di(meth)acrylates are used, it is preferable to use them in combination with the monofunctional (meth)acrylate as above for the purpose of preventing the obtained hollow polymer particles form aggregation. Particularly, the molar ratio of the (meth)acrylate to be used in the radical polymerizable water-insoluble monomer (b2) is preferably equal to or more than 0.7.

As the radical polymerizable water-insoluble monomer (b2), in addition to the (meth)acrylate, for example, a styrenic compound, a vinyl ester, a vinyl ether, a bisvinyl compound, and the like can be used singly or in combination of two or more kinds thereof. At this time, from the viewpoint that the hollow polymer particle of the present invention is easily obtained, it is preferable to use the (meth)acrylate in combination, and it is particularly preferable to have a molar ratio of the (meth)acrylate to be used in the radical polymerizable water-insoluble monomer (b2) equal to or more than 0.5.

The styrenic compound is a compound having a styryl group, and examples thereof include styrene, α-methyl styrene, vinyl toluene, α-chlorostyrene, o-, m-, p-chlorostyrene, p-ethyl styrene, p-tert-butoxystyrene, m-tert-butoxystyrene, p-acetoxystyrene, p-(1-ethoxyethoxy)styrene, p-methoxystyrene, styryltrimethoxysilane, styryltriethoxysilane, vinyl naphthalene, vinyl biphenyl, vinyl anthracene, vinyl pyrene, and the like.

Examples of the vinyl ester include vinyl formate, vinyl acetate, vinyl propionate, vinyl monochloroacetate, vinyl pivalate, vinyl butyrate, and the like.

Examples of the vinyl ether include methyl vinyl ether, ethyl vinyl ether, n-propyl vinyl ether, isopropyl vinyl ether, n-butyl vinyl ether, isobutyl vinyl ether, 2-ethyl hexyl vinyl ether, octadecyl vinyl ether, cyclohexyl vinyl ether, allyl vinyl ether, cyclohexanedimethanol monovinyl ether, 1,4-butanediol divinyl ether, nonanediol divinyl ether, cyclohexanediol divinyl ether, cyclohexanedimethanol divinyl ether, trimethylpropane trivinyl ether, pentaerythritol tetravinyl ether, phenyl vinyl ether, and the like.

Examples of the bisvinyl compound include divinyl benzene or the like, which causes a crosslinking structure in the shell of the hollow polymer particle, and thus enables a stable hollow particle to be prepared, which is therefore preferable.

The ratio of the radical polymerizable water soluble monomer (b1) to the radical polymerizable water-insoluble monomer (b2) to be used, respectively, is selected according to the average particle diameter or the thickness of the shell wall of a desired hollow polymer particle. From the viewpoint that a hollow polymer particle capable of being stably present in an aqueous medium can be obtained, and the hollow structure is also stable, the molar ratio (b2)/(b1) of the radical polymerizable water soluble monomer (b1) to the radical polymerizable water-insoluble monomer (b2) is preferably from 3.5 to 12, and particularly preferably from 3.5 to 10. Further, when the monomers are not added at once, but after the polymerization proceeds to a degree to form a hollow polymer particle and then the radical polymerizable water-insoluble monomer (b2) is added thereto to control the average particle diameter or the thickness of the shell wall of the hollow polymer particle, a hollow polymer particle which is stable even at a ratio of more than 12 can be obtained.

Examples of the aqueous medium used for the pseudoemulsion polymerization include, in addition to water to be used singly, a mixed solvent of water with a single or plural species of lower alcohols such as methanol, ethanol, isopropanol, and the like, polyhydric alcohols such as ethylene glycol, propylene glycol, butanediol, diethylene glycol, triethylene glycol, and the like, ketones such as acetone, methyl ethyl ketone, and the like, and ethers such as tetrahydrofuran and the like.

When a mixed solvent is used, the blending ratio is in the range of a range in which the water soluble polymerization initiator to be described later and the radical polymerizable water soluble monomer (b1) are soluble, and the solubility of the radical polymerizable water-insoluble monomer (b2) is equal to or less than 0.5% by mass, and can be suitably selected depending on the purposes. In order to maintain the high polymerization initiation efficiency by the water soluble polymerization initiator, the amount of water is preferably equal to or more than 50% by mass, and particularly preferably equal to or more than 80% by mass.

The water soluble polymerization initiator is not particularly limited, and various ones can be used. However, from the viewpoint of easy polymerization, it is preferable to use a persulfate or an amino group-containing an azo compound. Examples thereof include potassium persulfate (KPS), ammonium persulfate (APS),
2,2'-azobis(2-amidinopropane)dihydrochloride,
2,2'-azobis[2-(2-imidazolin-2-yl)propane]dihydrochloride,
2,2'-azobis[2-(2-imidazolin-2-yl)propane]disulfate dihydrate,
2,2'-azobis[N-(2-carboxyethyl)-2-methylpropionamide],
2,2'-azobis(1-imino-1-pyrrolidino-2-methylpropane]dihydrochloride,
2,2'-azobis{2-[1-(2-hydroxyethyl)-2-imidazolin-2-yl]propane}dihydrochloride,
2,2'-azobis[2-(2-imidazolin-2-yl)propane],
2,2'-azobis[2-methyl-N-(2-hydroxyethyl)propionamide],
2,2'-azobis{2-methyl-N-[1,1-bis(hydroxymethyl)-2-hydroxyethyl]propionamide},
2,2'-azobis(2-methylbutaneamideoxime) dihydrochloride tetrahydrate, and the like.

The ratio of the water soluble polymerization initiator to be used may be suitably selected within a range from 0.1 to 5 parts by mass, relative to 100 parts by mass of the total amount of the radical polymerizable water soluble monomer (b1) and the radical polymerizable water-insoluble monomer (b2). However, for the purpose of increasing the efficiency of the polymerization reaction and inhibiting the aggregation of the hollow polymer particles, it is more preferably selected within a range from 0.5 to 3 parts by mass.

Further, upon the polymerization as above, various suitable dispersion stabilizers may be used together, if necessary. Examples of the dispersion stabilizer include an anionic surfactant, a nonionic surfactant, a cationic surfactant, an amphoteric surfactant, an organic suspension protecting agent, and the like. Among these, from the viewpoint that the dispersion stability of the obtained hollow polymer particle is excellent, an anionic surfactant and a cationic surfactant are preferably used.

Examples of the anionic surfactant include rosinates such as potassium rosinate, sodium rosinate, and the like, sodium or potassium salts of fatty acids such as potassium oleate, potassium laurate, sodium laurate, sodium stearate, potassium stearate, and the like, sulfate esters of aliphatic alcohols such as sodium lauryl sulfate and the like, alkyl allyl sulfonic acids such as sodium dodecyl benzene sulfonate and the like, and others.

Examples of the nonionic surfactant include an alkyl ester, an alkyl ether, an alkyl phenyl ether, and the like of polyethylene glycol.

Examples of the cationic surfactant include surfactants based on an alkyl trimethyl ammonium salt, a dialkyldimethyl ammonium salt, an alkyl dimethyl benzyl ammonium salt, and an amine salt.

Examples of the amphoteric surfactant include an alkyl amino fatty acid salt, an alkyl betaine, an alkyl amine oxide, and the like.

These dispersion stabilizers can be used singly or in combination of two or more kinds thereof, if necessary. For the use of the dispersion stabilizer, it is preferable to use an ionic surfactant having the same electric charge as the surface electric charge given to the particle by a water soluble polymerization initiator, or a nonionic surfactant in order to prevent the aggregation of the obtained hollow polymer particles.

The amount of the dispersion stabilizer to be used may be suitably selected according to the need, but if the concentration at the early step of the reaction is too high, common emulsion polymerization proceeds, and thus, the particle hardly exhibits a hollow structure. As a result, an amount to be used is prepared at the early step, and then added later with formation of the particle.

The reaction temperature of the pseudoemulsion polymerization may be suitably set within the range from 35 to 90° C. according to the polymerization initiation temperature of the water soluble polymerization initiator. However, it is preferable to set the temperature within the range from 40 to 85° C. and it is more preferable to set the temperature in the range from 60 to 80° C., in order to increase the initiation ability of the water soluble polymerization initiator and inhibiting the instabilization of the reaction system by preventing the evaporation of the aqueous medium.

If the concentration of the monomers upon the pseudoemulsion polymerization is too low, the synthesis efficiency of the hollow polymer particle is low, whereas if the concentration is too high, aggregation easily occurs. Thus, it is preferable to suitably select the concentration in the range from 0.5 to 20% by mass according to the purpose. It is preferable to select the concentration within the range from 1 to 10% by mass in order to obtain a more stable hollow polymer particle in a good efficiency.

In the pseudoemulsion polymerization, as the method for introducing the starting material, a one-pot preparation method of a conventional radical polymerization, in which the radical polymerizable water soluble monomer (b1) and the radical polymerizable water-insoluble monomer (b2) are added in the amounts to be each transferred in the aqueous medium, thereby carrying out the polymerization using a water soluble polymerization initiator, can be adopted.

Further, the synthesis can also be performed in a one-pot preparation method, in which parts of the radical polymerizable water soluble monomer (b1) and the radical polymerizable water-insoluble monomer (b2) are added in advance in the aqueous medium to carry out the polymerization using a water soluble polymerization initiator, and after proceeding the polymerization reaction, a radical polymerizable water-insoluble monomer (b2) which is the same as or different from one previously used is then added thereto, can be adopted. In the case of using the post-addition method, the thickness of the shell wall of the hollow structure can be increased.

Organic/Inorganic Composite Coating Film

The organic/inorganic composite coating film of the present invention has a spherical internal hollow structure and an peak-valley pattern on the surface. The spherical hollow structure as mentioned in the present invention refers to a structure in which the hollow polymer particles are regularly arranged along the cross-section of coating film comprising of a continuous phase of a metal oxide, and it is particularly preferably a regular porous structure formed by close packing of the particles in a three dimensional space. Further, the peak-valley pattern on the film surface refers to a semispherical peak-valley profile formed by the array of the hollow polymer particles over the entire coating film surface, it is preferably a semispherical peak-valley pattern formed by the close packed densest packing array, and it is most preferably a honeycomb shaped pattern. That is, the film is a self-organized coating film in which the metal oxide forms a continuous film along the entirety of the three dimensional array structure of the hollow polymer particle, and thus, the metal oxide and the hollow polymer particle are hybridized.

In the present invention, the reason why the hollow polymer particle ultimately induces a regular and three dimensional periodic structure can be estimated as follows. In the coating liquid including the hollow polymer particles, an osmotic pressure is generated inside and outside the particle. By this osmotic pressure, a certain exclusion interaction occurs between the particles, and thus, the random aggregation between the particle and the particle is prevented. That is, the hollow polymer particle is already provided with a certain array structure in the sol-like coating liquid. Accordingly, when this coating liquid is coated, a particle array having a three dimensional structure is already formed, the phase transformation from sol to gel proceeds with the evaporation of moisture, alcohols, and the like in the sol liquid, and the particles in the arranged state are incorporated into the gelled coating film. The sol-gel process proceeds outside the particle or on the outer surface of the particle, but at this time, the moisture or alcohols from the hollow polymer particle are discharged with a certain time delay. This delay effect prevents a rapid formation of a gelled binder phase, and thus, relieves the stress of the coating film formation. It is believed that as a result of this collaboration, a stable coating film with a large area having a particle array structure maintained is formed.

The thickness of the organic/inorganic composite coating film can be adjusted to be from 1 to 50 μm according to the size of the hollow polymer particle (B) or the amount of the applied aqueous coating composition comprising the metal alkoxide (A), an aqueous dispersion of the monodispersible hollow polymer particles (B), and an acid catalyst (C) to be described later. The spherical pore diameter in the coating film cross-section structure in the thickness direction is directed by the size of the hollow polymer particle (B), and preferably generally in the range from 40 to 780 nm.

The surface pattern of the organic/inorganic composite coating film is basically directed by the array pattern on the top surface of the coating film of the hollow polymer particle (B), and it is a peak-valley pattern structure derived from the protrusion of approximately half of the hollow polymer particle (B). Accordingly, the semispherical peak-valley profile is indicative of the diameter of the hollow polymer particle (B), and the maximum width of the semisphere can be controlled to be from 50 to 800 nm, which is equal to or less than the diameter of the hollow polymer particle (B), and the maximum depth of the peak-valley profile can be controlled to be from 25 to 400 nm, which is equal to or less than the maximum radius of the hollow polymer particle (B).

Further, the peak-valley profile preferably extends in a honeycomb shape, and the pattern structure can be formed over the entire coating film surface. The distance between the adjacent convex upper portions or the concave lower portions, which form a honeycomb shape, is widened by the increase in the diameter of the hollow polymer particle (B), but it can be controlled to be 1.2 to 1.5 times lager than the diameter of the hollow polymer particle (B).

The content of the metal oxide (A') in the organic/inorganic composite coating film is preferably in the range from 30 to 90% by mass, and more preferably in the range from 35 to 75% by mass. If the amount of the metal oxide (A') is in this range, a uniform matrix of the metal oxide can be formed over the entire coating film, and cracks are hardly forming in the film.

The organic/inorganic composite coating film of the present invention is transparent or translucent and can be designed to have a pencil hardness of 5H to 9H or more, a high coating film hardness, and a strong wear resistance.

Aqueous Coating Composition

The aqueous coating composition used in the present invention can easily yield the above-described organic/inorganic composite coating film, and contains the metal alkoxide (A), the aqueous dispersion of the monodisperse hollow polymer particles (B), and the acid catalyst (C).

In the aqueous coating composition, a sol of the metal oxide (A') is formed by the hydrolysis and condensation reactions of the metal alkoxide (A), but a part of the sol is concentrated on the outer surface of the hollow polymer particle (B). As a result, a structure in which the outer surface of the hollow polymer particle (B) in the aqueous coating composition is already hybridized with the sol of the metal oxide (A') is formed. Accordingly, the sol of the metal oxide (A') and the hollow polymer particle (B) having the outer surface covered with the sol are present in the aqueous coating composition. After coating the composition on a substrate, a volatile component is evaporated, and thus, the hollow polymer particle (B) covered with the sol of the metal oxide (A') forms a three dimensional close packed array structure, and finally, the structure is fixed with the sol of the metal oxide (A'). As a result, it forms a coating film having a spherical cavity inside the coating film and a semispherical peak-valley profile on the top surface.

It is particularly preferable that the outer surface of the hollow polymer particle comprises of a high density segment having a structure derived from a (meth)acrylamide, a (meth) acrylic acid, or an amino group-containing (meth)acryl ester from the viewpoint that the above-described mechanism can be easily developed. In the case where it has a structure derived from the amino group-containing (meth)acryl ester, if it is protonated, the effect of stabilizing the sol of the metal oxide (A') is high, and as a result, it is preferable that the amino group of the hollow polymer particles (B) is partially protonated or completely protonated.

The aqueous medium used in the aqueous coating composition is water, or a mixed solvent of water and a water soluble solvent, and as the water soluble solvent, a solvent including alcohols such as methanol, ethanol, isopropanol, and the like, ketones such as acetone, and the like, pyridine, dimethyl formamide, and the like can be used. In the case of using a mixed solvent of water and a water soluble solvent, the amount of the water soluble solvent is preferably less than 40% by mass, relative to the amount of water to be used.

The mixing order is not particularly limited, but the aqueous coating composition can be prepared by a method of adding an aqueous solution of the acid catalyst (C) and a solution of the metal alkoxide (A) to the aqueous dispersion of the hollow polymer particles (B), a method of adding the acid catalyst (C) to an aqueous solution of the metal alkoxide (A) to carry out the preliminary hydrolysis of the metal alkoxide (A), and then adding the aqueous dispersion of the hollow polymer particles (B), or by other methods.

As the acid catalyst (C), for example, inorganic acids such as hydrochloric acid, nitric acid, sulfuric acid, phosphoric acid, boric acid, and the like, and organic acids such as acetic acid, phthalic acid, fumaric acid, maleic acid, malic acid, acrylic acid, methacrylic acid, trifluoromethyl sulfonic acid, ethyl sulfonic acid, and the like can be used. These acids may be used singly or in a combination of two or more kinds thereof. Among these, unsaturated organic acids such as maleic acid, acrylic acid, and the like are preferably used from the viewpoint that they allow the pH to be easily adjusted, and provide good storage stability of the obtained aqueous coating composition, and excellent water resistance of the obtained organic/inorganic composite coating film. In addition, the pH of the aqueous coating composition is preferably adjusted to be within the range from 1.5 to 6.5 from the viewpoint of good stability of the aqueous coating composition and the coating film formation (curing) after coating onto the substrate.

Further, in order to prepare the aqueous coating composition, a ratio of (A)/(B) of the mass of the metal alkoxide (A) to the mass of the hollow polymer particle (B) ranging from 30/70 to 95/5 is preferably, a ratio ranging from 60/40 to 85/15 is particularly preferable, and a ratio ranging from 65/35 to 75/25 is more preferable. If the ratio (A)/(B) is equal to or less than 95/5, the number of cracks in the obtained coating film can be reduced, and if the ratio is equal to or more than 30/70, the water resistance in the coating film is improved.

Further, the amount of the aqueous medium to be used is preferably from about 0.2 to 50 times of the amount of the metal alkoxide (A) to be used.

To the aqueous coating composition, various organic solvents such as, for example, ethyl cellosolve, propylene glycol mono butyl ether, propylene glycol dibutyl ether, and diethylene glycol mono propyl ether can be added as long as the effects of the present invention are not adversely affected. Also, various additives such as lubricating agents and wetting agents can be added.

Further, to the aqueous coating composition used in the present invention, various curing agents, for example, water soluble polyglycidyl ether and the like can be also added as long as the effects of the present invention are not adversely affected.

The aqueous coating composition can be easily cured after being coated on the substrate at normal temperature or by heat treatment to form an organic/inorganic composite coating film. In the case of curing by heating, the heating temperature can be selected within the range of from 60 to 250° C., and it is particularly preferable to carry out the treatment at 80 to 120° C. for 20 minutes to 40 minutes. It is particularly preferable to increase the curing temperature to 150° C. or higher in order to obtain a high hardness coating film having a pencil hardness of 9H or more.

Solid Substrate

The substrate (X) used in the present invention is not particularly limited in terms of its material property or shape, as long as it can form the above-described organic/inorganic composite coating film on the substrate. However, in the case of forming the structural color film on the substrate, that is, in the case of calcination of the above-described organic/inorganic composite coating film to be described later and the substrate together, it is essential to not have a change in the substrate itself upon calcination, and specifically, the solid substrate (X1) is required to have heat resistance at 250° C. or higher. The shape or constituent of the solid substrate (X1) is not particularly limited, any shape capable of applying the aqueous coating composition is allowed, and a substrate including various glass materials, metal materials, metal oxide materials, and the like can be suitably used. If these substrate are used, in the process of coating film formation, a strong bond between the coating film and the substrate is formed, for example, a covalent bond is formed by a condensation reaction with a hydroxyl group of the substrate surface, and a hydrogen bond with a hydrophilic group or an oxide layer is formed. As a result, a stable coated substrate with a large area can be obtained. Further, the expression that the solid substrate has heat resistance at 250° C. or higher means that the softening temperature or melting point of the substrate is 250° C. or higher.

As the glass material, for example, soda lime glass, crystal glass, borosilicate glass, quartz glass, or the like can be used, and this glass may include a metal, a metal oxide, and the like. Further, examples of the metal material include materials such as gold, silver, platinum, iron, copper, zinc, tungsten, nickel, aluminum, carbon, silicone, and the like. Further, as the metal oxide material, for example, a substrate of a mixed oxide of one or plural species of alumina, titanium oxide, zirconium oxide, zinc oxide, iron oxide, indium oxide, tin oxide, and the like can be used. In addition, this composition may additionally contain $Li_2O$, $Na_2O$, $K_2O$, MgO, CaO, SrO, BaO, $B_2O_3$, $P_2O_5$, or the like.

As the shape of the substrate, various shapes such as a rod shape, a spherical shape, a semi-spherical shape, a pyramid shape, and the like, in addition to a substrate having a plate shape, can be used. The surface to be coated is not limited to a flat surface, and those having a curved surface can also be suitably used. Therefore, a glass, a bowl, a dish, a tile, or the like which is generally commercially available can be used as a substrate.

Further, in the case where coating onto a substrate (X) is difficult, a pre-coating agent called a primer may be applied in advance onto a substrate.

Further, the base material used in the case where the structural color film of the present invention is prepared as a self-standing film, it does not require the heat resistance as for the above-described solid substrate (X1). The substrate which is capable of applying the aqueous coating composition can be used without any particular limit, and can be selected according to the purpose. A substrate which has weak adhesion to a common aqueous composition, such as polyethylene, polyvinyl chloride, and the like can be particularly preferably used from the viewpoint that it allows a process for obtaining an organic/inorganic composite coating film and then peeling it off to be easier.

For example, in the case where the aqueous coating composition is applied onto a substrate of polyethylene or polyvinyl chloride, once the organic/inorganic composite coating film is formed by drying, a part or a whole the film is peeled off from the substrate surface. By peeling off the film after drying, a self-standing organic/inorganic composite coating film can be obtained. Thereafter, a structural color film having a thin film shape can be obtained by the method described later.

The method for coating the aqueous coating composition onto the substrate (X) is not particularly limited, and various methods such as, for example, painting with brush, a dip coating method, a spray coating method, a roll coating method, a bar coating method, and an air knife coating method can be used, and a combination thereof can also be used.

Step for Preparing Structural Color Film
Coating of Aqueous Coating Composition

The first step in the method for preparing the structural color film of the present invention is the same as in the method for preparing the above-described organic/inorganic composite coating film on the substrate (X).

Step for Calcination of Organic/Inorganic Composite Coating Film

The first method for preparing the structural color film of the present invention is a method in which the coated substrate obtained at the above-described step is calcined together with a substrate to obtain a substrate coated with the structural color film. The calcination temperature can be suitably selected within the temperature range from 250 to 1300° C. depending on the kind of the solid substrate (X1) or purpose. As the calcination temperature, it is necessary to select a temperature which is equal to or lower than the heat resistance temperature of the solid substrate (X1), and for example, in the case of using a low melting point soda glass as the substrate, it is preferable to carry out calcination at a temperature in the range from 250 to 500° C., whereas in the case of using a high melting point quartz glass as the substrate, it is possible to carry out calcination at a temperature in the range from 250 to 1000° C. Further, in the case of using highly heat resistant ceramics such as alumina and the like, it is possible to carry out calcination at a temperature in the range from 250 to 1300° C.

The second method for preparing the structural color film of the present invention is a method in which a self-standing structural color film is obtained by calcination of the organic/inorganic composite coating film peeled off from the coating substrate. The calcination temperature can be suitably selected within the temperature range from 250 to 1300° C. according to the purpose. When the peeled organic/inorganic composite coating film is calcined burned, the calcination burning may be carried out between the two heat resistant flat substrate in order to inhibit the generation of warpage or cracks. In this case, the heat resistant substrate can be suitably selected from the materials for the solid substrate (X1).

Further, by the selection of the calcination temperature, it is possible to allow the organic component to remain in the structural color film, thereby obtaining a structural color film exhibiting a different color from the same coating substrate. For example, if the calcination is carried out under the condition that the organic component has not been completely decomposed and lost in the formed organic/inorganic composite coating film, a structural color film having a color tone added with a slightly yellow to brown color in addition to the color development derived from the three dimensional, periodic porous structure inside the structural color film can be obtained. The condition that the organic component is not completely decomposed and lost in the film can be set, for example, by using thermogravimetric analysis, or the like, and measuring the heating pyrolytic behavior of the coating film in advance.

In addition, by changing the atmosphere upon the calcination of the coating substrate from under aerated condition to under nitrogen, under argon, or other conditions, the organic component in the organic/inorganic composite coating film is carbonized, and thus, a carbonized organic substances (D) derived from the metal alkoxide (A) and/or the hollow polymer particle (B) can be contained in the structural color film. In this case, the black color of the carbonized organic substances (D) is added to the color development derived from the three dimensional, periodic porous structure inside the structural color film, and accordingly, a structural color film having more depth and exhibiting the different color development can be obtained from the same coating substrate, or the like can be obtained. For the change of atmosphere, the atmosphere may be completely changed before heating and calcination and then the heating and calcination may be carried out, or the atmosphere may be changed at the heating step, depending on the purpose.

For the calcinations, a microwave oven, or the like, can be used, in addition to various calcination furnaces such as generally known muffle furnaces, atmosphere furnaces, infrared furnaces, and the like.

Structural Color Film

The structural color film of the present invention is a film, wherein the film including a matrix having an inverse opal structure comprising of the metal oxide (A') as a main constituent is formed on the solid substrate (X1), or a self-standing film including a matrix having an inverse opal structure comprising of the metal oxide (A') as a main constituent. The "inverse opal structure" refers to a structure having spherical cavities having uniform diameters, which are periodically arranged in three dimensions while copying an opal structure as a template, in a solid, with respect to the term "opal structure" in which the particles are periodically arranged in three dimensions, as mentioned above.

The thickness and diameter of the spherical pore on the film cross-section in the thickness direction of the structural color film of the present invention substantially maintains the original shape of the organic/inorganic composite coating film which has been prepared at the first step of preparation. Accordingly, the thickness is in a range from 1 to 50 μm and the internal spherical pore diameter is generally in the range from 40 to 780 nm, as described above.

In the method for preparing the structural color film of the present invention, it is possible to apply a thin film having such a thickness onto a substrate having a size of at least 1 cm square size, thereby obtaining a structural color film with a large area having no defects such as cracks and the like. Accordingly, the length of the shortest side of the film plane relative to the thickness of the film is at least 1,000 times or more, and those having a length of 10,000 times or more can also be conveniently prepared. In the present invention, the length of the shortest side of the film plane refers to the length of the shortest side of the plane direction of a film having no defects such as cracks, ruptures, and the like in a structural color film having an inverse opal structure.

The structural color film having an inverse opal structure comprising of a metal oxide as conventionally proposed is one obtained by interpenetrating the precursor of a metal oxide among the particles in the opal structure in which the particles are arranged, heating and burning to remove the organic components, and performing a condensation reaction of the metal oxide. Accordingly, it is difficult to prepare a structural color film with a large area since the entire material contracts with heating and calcinations, so that the inverse opal structure cannot be maintained on the substrate and a large number of cracks are easily generated. On the other hand, an organic/inorganic composite coating film is prepared on the substrate at the first step in the method for preparing the structural color film of the present invention. This organic/inorganic composite coating film has a structure characterized in that a monodisperse hollow polymer particle having a three dimensional periodic structure is combined in a matrix comprising a metal oxide, in which the matrix comprising of a metal oxide refers to a structure in which a continuous phase of the metal oxide material is constructed over the entire coating film, as described above. The continuous phase comprising of a metal oxide, which is a matrix, is not substantially contracted even through the heating and calcination step carried out afterwards, and the removal of the organic component only can be carried out. This is apparent from a fact that the structural color film of the present invention substantially maintains the internal structure of the organic/inorganic composite coating film that has been prepared at the first step. Accordingly, the structural color films having a uniform diameter spherical cavity having an average diameter of about 40 nm to 780 nm having an inverse opal structure inside can be prepared according to the purpose. In order to sufficiently diffract and interfere light in the visible light region, the uniform average diameter of the spherical cavity is preferably from 100 nm to 600 nm, and more preferably from 200 nm to 500 nm.

As one form of the structural color film of the present invention, a structural color film containing a carbonized organic substances derived from the metal alkoxide (A) and/or the hollow polymer particle (B) can be prepared. In the case where the metal oxide (A') comprises of a material having a relatively high light transparency such as silica and the like, or a material having a high reflectance such as titanium oxide, and the like, the structural color by light diffraction or interference may be difficult to be seen in some cases, because of the light transmission or scattering from the surroundings. At this time, by incorporating the carbonized organic substances showing a black color, and thus exhibiting a shielding effect, it becomes possible to develop a clearer structural color. Further, by controlling the amount of the remaining carbonized organic substances, the ratio of the transmitted and scattered light to the diffracted and interfered light changes, and therefore, it is also possible to prepare a structural color film having a different color tone, from the same aqueous coating composition.

The amount of the remaining carbonized organic stances can be carried out by controlling the calcination temperature and the atmosphere during the process for calcination of the organic/inorganic composite coating film at the second step in the preparation of the structural color film, as described above. The amount of the remaining carbide varies depending on the kind of the hollow polymer particle (B) to be used or the composition of the aqueous coating composition to be used, but the carbonized organic substances preferably remains at a ratio of 1 to 60% by mass, and more preferably at a ratio in the range from 1 to 40% by mass, in the structural color film after calcination.

EXAMPLES

Hereinbelow, the present invention will be described in more detail with reference to Examples, but the present invention is not limited to these Examples. Further, unless otherwise specified, "%" represents "% by mass".

Measurement Equipment

For the observation of the shape and hollowness of the fine particle, a VE-9800 scanning electron microscope (SEM) manufactured by Keyence Co. was used.

For the measurement of the hardness (universal hardness) of the composite coating film, a Fischerscope H100 hardness tester manufactured by Helmut Fischer was used.

For the observation of the cross-sectional shape of the coating film surface, a VE-9800 scanning electron microscope (SEM) manufactured by Keyence Co. and a SPI4000 Atomic force microscope (AFM) manufactured by SII Nanotechnology Inc. were used.

For the measurement of the UV-vis reflectance spectrum of the organic/inorganic composite coating film, a U-3500 spectrophotometer manufactured by Hitachi, Ltd. was used.

For the measurement of the UV-vis reflectance spectrum of the structural color film, a gonio-spectrophotometric color measurement systems GCMS-11 manufactured by Murakami Color Research Laboratories was used.

For the thermogravimetric analysis of the structural color film, a thermogravimetry-differential thermal analyzer (EX-STAR6000 TG/DTA) manufactured by SII Nano Technology Inc. was used.

For the analysis of the remaining organic components in the structural color film after calsination, a Raman laser microscope manufactured by Renishow Co. was used.

Synthesis Example 1

Synthesis of Hollow Polymer Particle B-1 Comprising PNIPAM-co-PGMA

Figure 2:
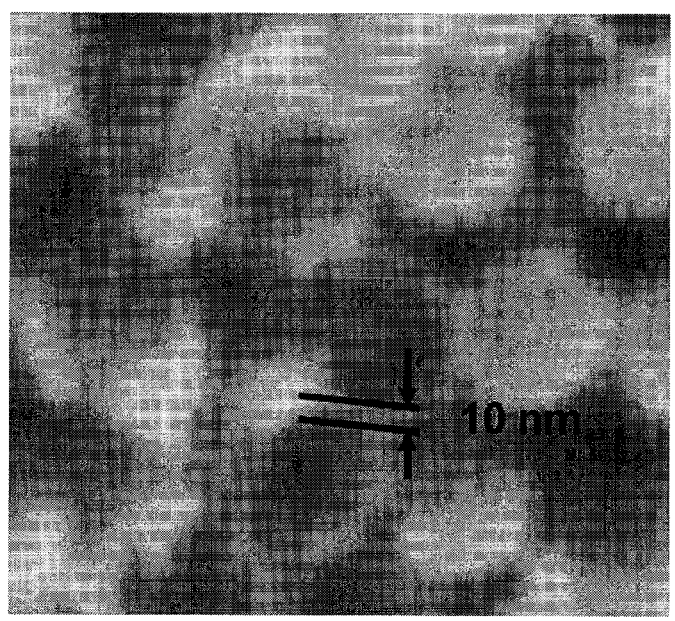
FIG. 2 is an SEM observation image showing the form of the crushed hollow polymer particle obtained in Synthesis Example 1.

To 290 ml of an aqueous solution in which 1.8 g of N-isopropylacrylamide (manufactured by Kohj in Co., Ltd., hereinafter referred to as NIPAM) had been dissolved was added 11.8 g of glycidylmethacrylate (manufactured by Wako Pure Chemicals Co., hereinafter referred to as GMA), followed by stirring at 70° C. under nitrogen flow (GMA/NIPAM=5.2 mol/mol). As the water soluble polymerization initiator, 10 ml of an aqueous solution in which 0.15 g of 2,2'-azobis(2-amidinopropane) dihydrochloride (V-50, manufactured by Wako Pure Chemicals Co.) had been dissolved was added thereto. By stirring it at the temperature for 1 hour, a dispersion liquid of the particles was obtained. This dispersion liquid was washed by a centrifuging operation, and then the shape of the fine particle was observed by means of SEM, and thus, it was found to be a monodisperse spherical particle having an average particle diameter of 225 nm (FIG. 1). This fine particle was crushed and its morphology observation was carried out. As a result, it could be confirmed that it was a hollow polymer particle having a cavity at the center of the particle (FIG. 2). The thickness of the shell wall of the particle was approximately 10 nm. Hereinafter, this hollow polymer is referred to as B-1.

Synthesis Example 2

Synthesis of Hollow Polymer Particle B-2 Comprising PACMO-co-PGMA

Figure 3:
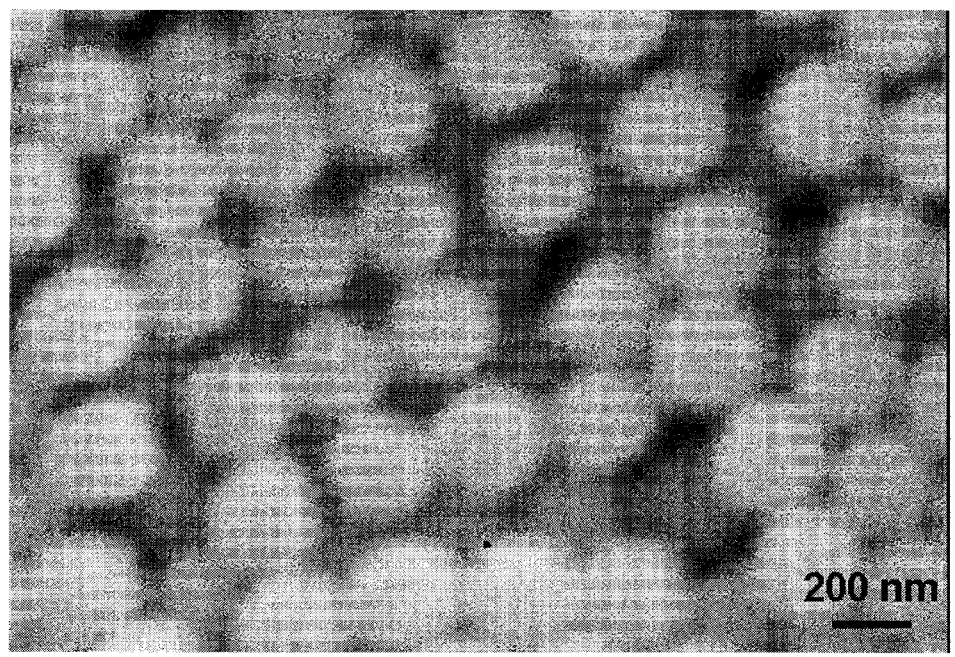
FIG. 3 is an SEM observation image showing the form of the hollow polymer particle obtained in Synthesis Example 2.
Figure 4:
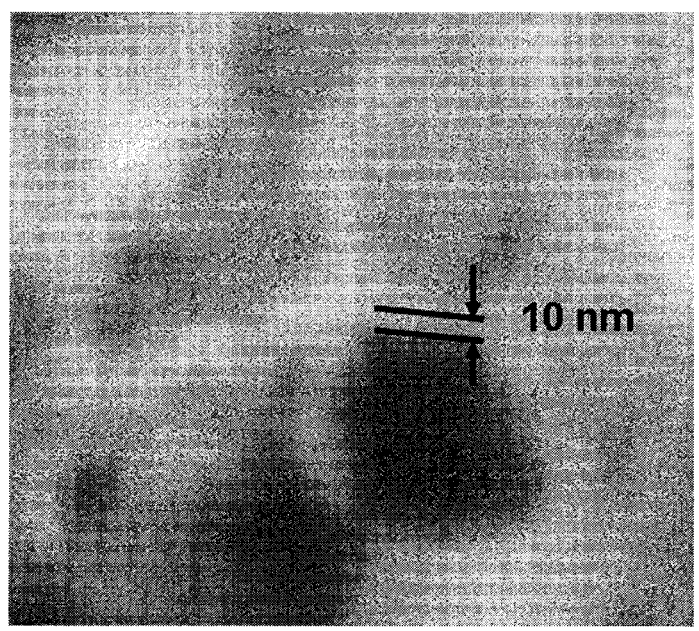
FIG. 4 is an SEM observation image showing the form of the crushed hollow polymer particle obtained in Synthesis Example 2.

To 290 ml of an aqueous solution in which 1.8 g of acryloyl morpholine (manufactured by Kohjin Co., Ltd., hereinafter referred to as ACMO) had been dissolved was added 13.5 g of GMA, followed by stirring at 70° C. under nitrogen flow (GMA/ACMO=4.8 mol/mol). 10 ml of the aqueous solution in which 0.15 g of V-50 as the water soluble polymerization initiator had been dissolved was added thereto. By stirring it at the temperature for 1 hour, a dispersion liquid of the particles was obtained. This dispersion liquid was washed by a centrifuging operation, and then the shape of the fine particle was observed by means of SEM, and thus, it was found to be a monodisperse spherical particle having an average particle diameter of 270 nm (FIG. 3). This fine particle was crushed and its morphology observation was carried out. As a result, it could be confirmed that it was a hollow polymer particle having a cavity at the center of the particle (FIG. 4). The thickness of the shell wall of the particle was approximately 10 nm. Hereinafter, this hollow polymer is referred to as B-2.

Example 1

Organic/Inorganic Composite Coating Film Using Aqueous Coating Composition Containing B-1

An off-white homogeneous aqueous coating composition was obtained by mixing 100 parts of an aqueous dispersion having the hollow polymer particle B-1 obtained in Synthesis Example 1 at a concentration of 20%, 20 parts of a 10% aqueous maleic acid solution, and 100 parts of a solution (50%) of a silane oligomer MS-51 (manufactured by Colcoat Co., Ltd.) in isopropanol, followed by stirring it in a bath at 20° C. for 2 hours.

Figure 5:
FIG. 5 is an SEM observation image showing the form of the composite coating film surface obtained in Example 2, which was cured at 25° C.
Figure 6:
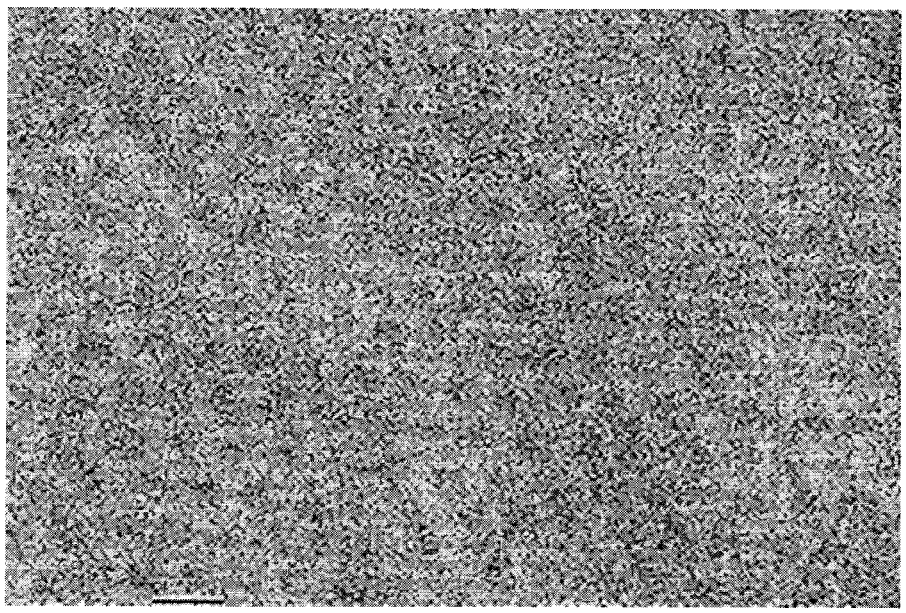
FIG. 6 is an SEM observation image showing the form of the composite coating film surface obtained in Example 2, which was cured at 80° C.
Figure 7:
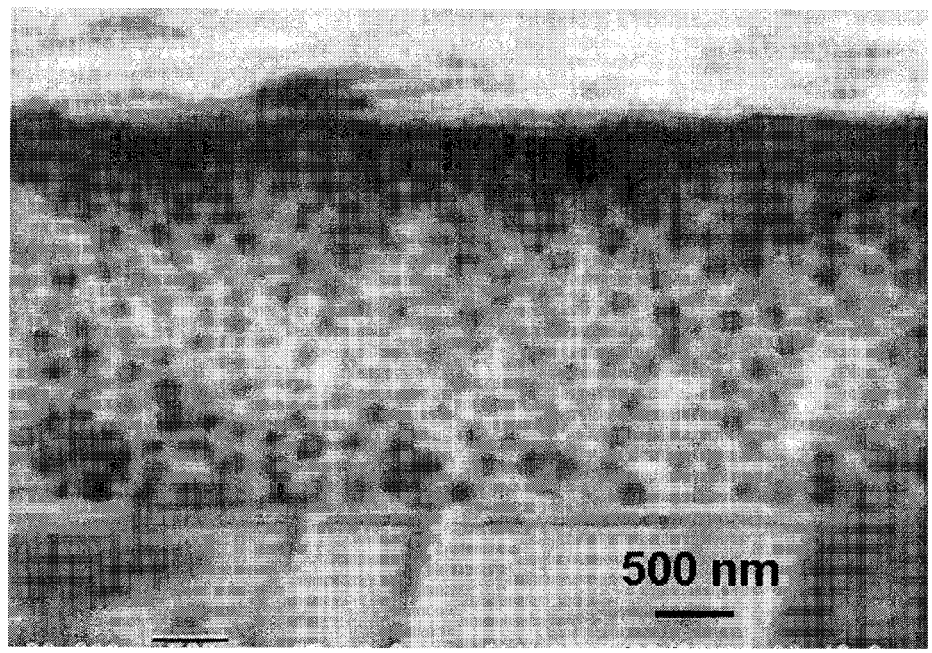
FIG. 7 is an SEM observation image showing the form of the cross-section of the composite coating film obtained in Example 2, which was cured at 25° C.

The aqueous coating composition prepared as above was coated on a glass substrate having a size of 2.5 cm×7 cm with a coating rod (No. 30), and the obtained composite coating film was cured at each of the temperatures 25, 80, 130, and 180° C. for 30 minutes, and as a result, a good organic/inorganic composite coating film having no cracks could be obtained. In the SEM observation of the composite coating film surface that had been cured at 25° C. and 80° C., the surface morphology in which the fine particles were regularly arranged in close packed array was found (FIG. 5 and FIG. 6). As a result of the observation of the cross-section of this film by means of SEM, a regular porous structure was found (FIG. 7).

TABLE 1

Variation in the physical properties of the coating film according to the curing temperatures (Example 1)

| | Curing temperature (° C.) | | | |
|---|---|---|---|---|
| | 25 | 80 | 130 | 180 |
| Universal hardness (N/mm$^2$) | 454.6 | 629.0 | 813.6 | 1259.0 |
| Pencil hardness | 5H | 6H | >9H | >9H |

Example 2

The coating substrate of the organic/inorganic composite coating film obtained in Example 1 was calcined at 500° C. for 1 hour under aerated condition using an electric furnace, and thus, a structural color film comprising silica, which had no defects such as cracks and the like over the entire surface and showed bright blue color, as observed in the direction perpendicular to the film plane, could be obtained. This film had an average film thickness of about 2.5 µm and a ratio L/D of the length (L) of the shortest side of the film plane to the thickness (D) of the film of 10,000.

Example 3

Figure 8:
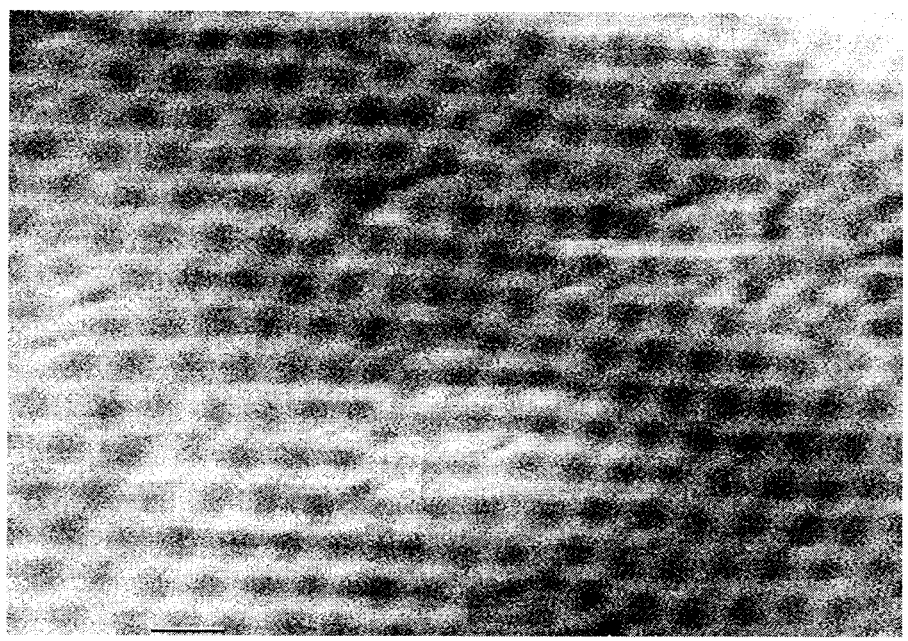
FIG. 8 is an SEM observation image showing the form of the composite coating film surface obtained in Example 3, which was pattern cured.

The aqueous coating composition prepared in Example 1 was coated with a painting brush on a glass plate, and left to stand at 25° C. From the SEM observation of the obtained pattern composite coating film surface, the surface morphology in which the fine particles were regularly arranged in close packed array was found (FIG. 8).

Example 4

By calcination of the coating substrate obtained in Example 3 at a temperature of 500° C. for 0.5 hour under aerated condition, a structural color film including silica, which showed bright blue color, could be obtained.

Example 5

Figure 9:
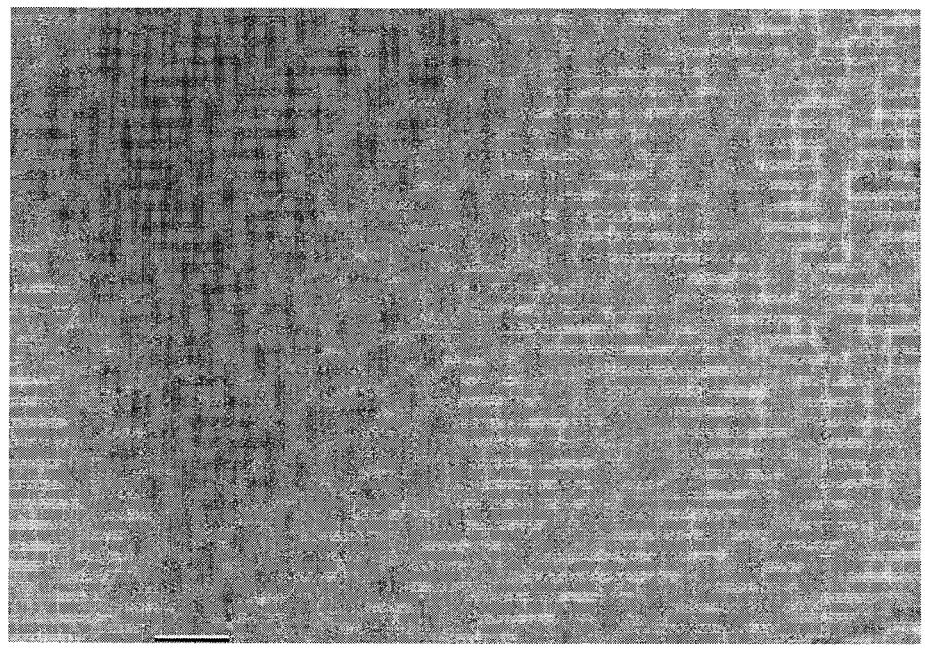
FIG. 9 is an SEM observation image showing the form of the composite coating film surface obtained in Example 5, which was formed on a wood board.

A wood board (cedar board) was dipped and coated in the aqueous coating composition prepared in Example 1 to form a composite coating film on the surface. From the SEM observation of the obtained composite coating film surface, the surface morphology in which the fine particles were regularly arranged in close packed array was found (FIG. 9).

Example 6

The aqueous coating composition used in Example 1 was coated on a black tile having 15 cm square size with a coating rod (No. 30). By calcination of the obtained coating substrate at a temperature of 500° C. for 0.5 hour under aerated condition, a structural color film comprising of silica, which showed bright blue color, could be obtained.

Example 7

Application was carried out by dipping and drawing up a glass substrate having a size of 2.5 cm×7 cm in the aqueous coating composition used in Example 1, thereby forming a composite coating film on the glass surface. By calcination of the obtained coating composite substrate at a temperature of 500° C. for 1 hour under aerated condition, a structural color film comprising silica, which showed bright blue color, as observed in the direction perpendicular to the film plane, which had no defects such as cracks and the like over the entire surface, could be obtained. This film had an average film thickness of about 2 µm and a ratio L/D of the length (L) of the shortest side of the film plane to the thickness (D) of the film of 12,500.

Example 8

Figure 10:
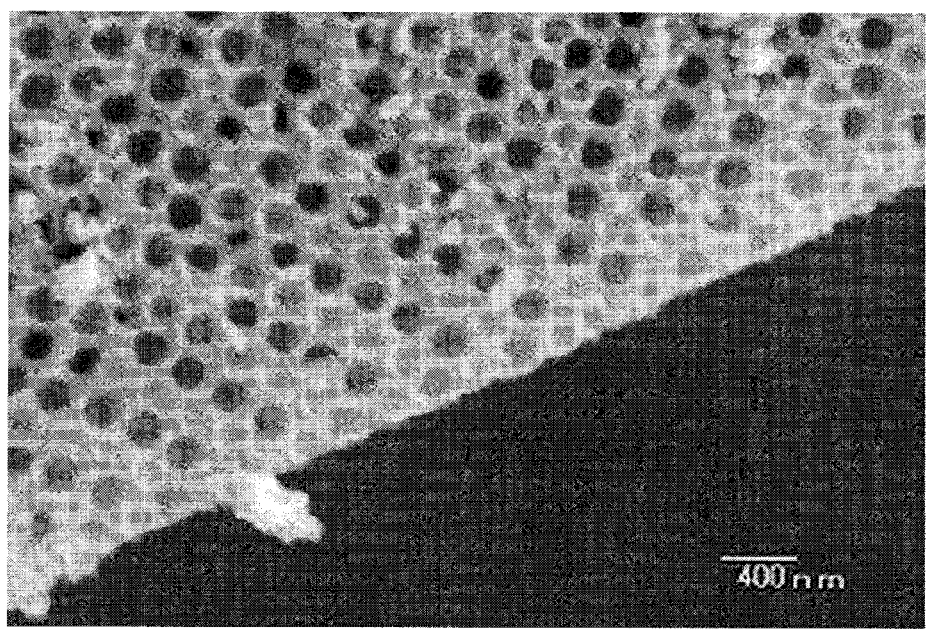
FIG. 10 is an SEM observation image showing the form of the cross-section of the structural color film obtained in Example 8, which was burned at 800° C.

The aqueous coating composition used in Example 1 was coated on a polyethylene plate having 5 cm square size to form a composite coating film. A part of this composite coating film was peeled off from the substrate with drying. This part was picked up with forceps, pulled out, and peeled off to obtain an independent organic/inorganic composite film. By heating and calcination of the obtained film to a temperature of 800° C. under aerated condition, a transparent structural color film comprising of silica, which showed bright light blue color and had no defects, could be obtained. From the SEM observation of the cross-section, the internal structure maintaining a structure in which the particles were arranged in close packed array was found (FIG. 10).

Example 9

Organic/Inorganic Composite Coating Film Using Aqueous Coating Composition Containing B-2

An off-white homogeneous aqueous coating composition was obtained by mixing 100 parts of an aqueous dispersion having the hollow polymer particle B-2 obtained in Synthesis Example 2 at a concentration of 25%, 20 parts of a 10% aqueous maleic acid solution, and 100 parts of a solution (50%) of a silane-oligomer MS-51 in isopropanol, followed by stirring in a bath at 20° C. for 2 hours.

Figure 11:
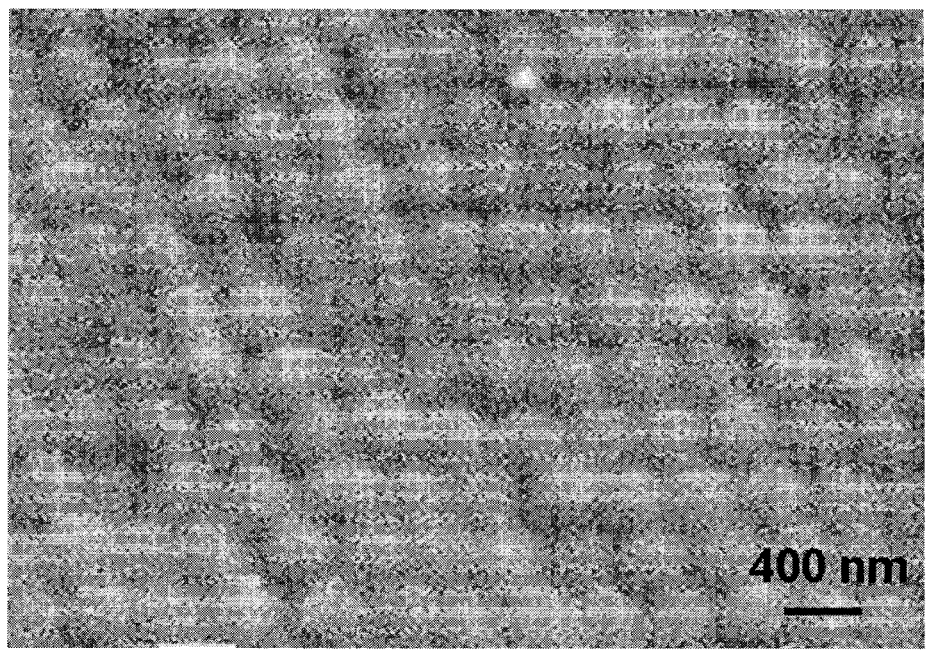
FIG. 11 is an SEM observation image showing the form of the composite coating film surface obtained in Example 9, which was cured at 25° C.
Figure 12:
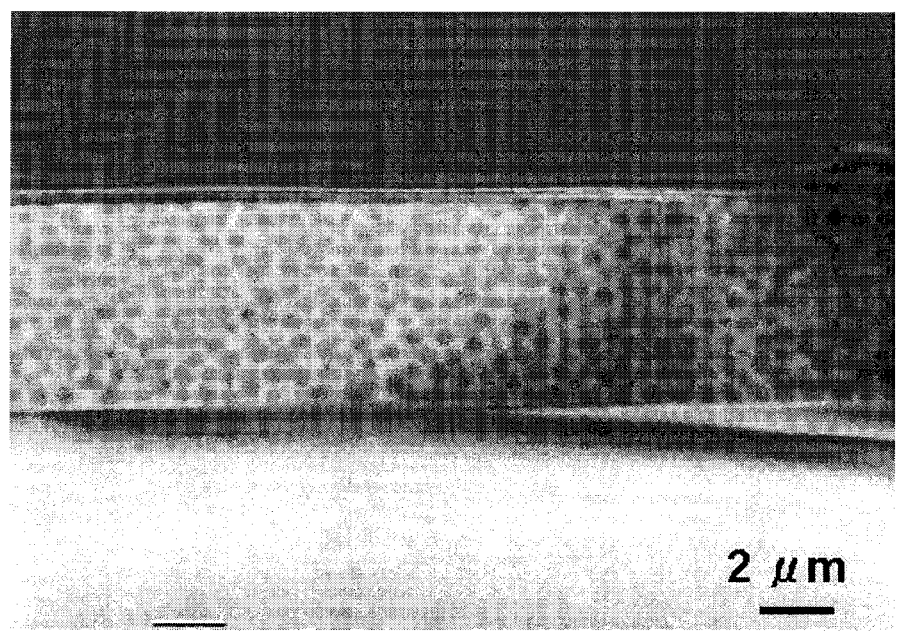
FIG. 12 is an SEM observation image showing the form of the cross-section of the composite coating film obtained in Example 9, which was cured at 25° C.
Figure 13:
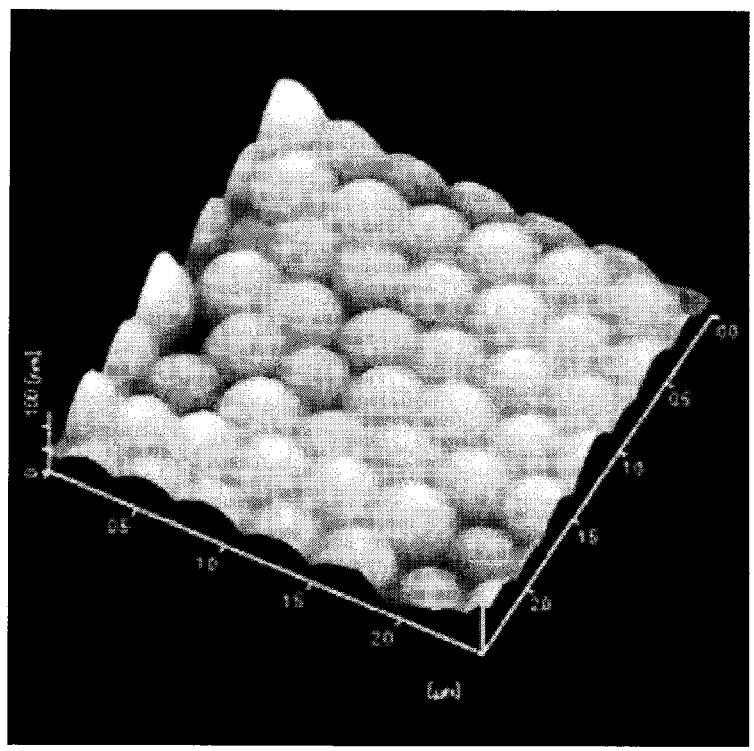
FIG. 13 is an AFM observation image showing the form of the composite coating film surface obtained in Example 9, which was cured at 25° C.
Figure 14:
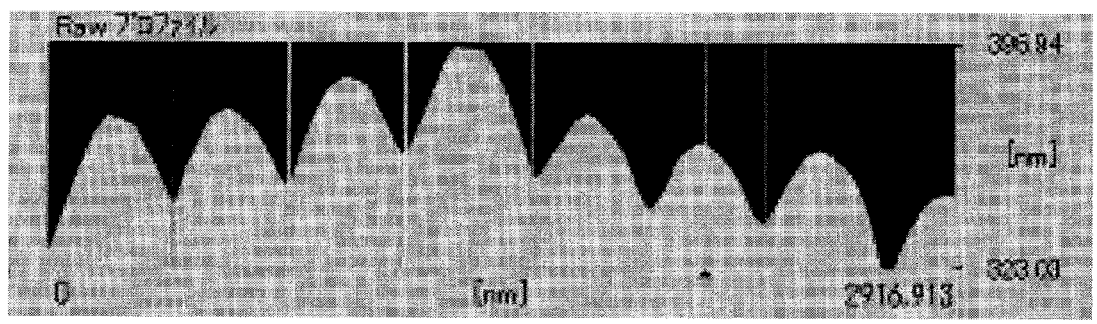
FIG. 14 is an AFM observation image showing the form of the cross-section of the composite coating film obtained in Example 9, which was cured at 25° C.

The aqueous coating composition prepared as above was coated on a glass substrate having a size of 2.5 cm×7.5 cm with a coating rod (No. 30), and the obtained composite coating film was cured at each of the temperatures 25, 80, 130, and 180° C. for 30 minutes, and as a result, a good film having no cracks could be obtained. In the SEM observation of the surface and cross-section of the composite coating film obtained at a curing temperature of 25° C., a regular arrange pattern of the fine particles was found (FIGS. 11 and 12). Further, in the AFM observation of the coating film, the regular peak-valley pattern was clearly shown by the surface particle array (FIG. 13), and the distance between the valleys was from 370 to 400 nm (FIG. 14).

TABLE 2

Variation in the physical properties of the coating film according to the curing temperatures (Example 9)

| | Curing temperature (° C.) | | | |
|---|---|---|---|---|
| | 25 | 80 | 130 | 180 |
| Universal hardness (N/mm$^2$) | 472.0 | 722.7 | 955.4 | 1380.4 |
| Pencil hardness | 5H | 6H | >9H | >9H |

Example 10

The coating substrate of the organic/inorganic composite coating film obtained in Example 9 was calcined at 500° C. for 1 hour under aerated condition using an electric furnace, and thus, a structural color film comprising of silica, which had no defects such as cracks and the like over the entire surface and showed bright green color, as observed in the direction perpendicular to the film plane, could be obtained. When the observation direction was tilted, a color shift from green to red was observed.

Example 11

The aqueous coating composition prepared in Example 9 was coated on a glass substrate having a size of 10 cm×10 cm with a coating rod (No. 30), and the obtained composite coating film was calcined at 500° C. for 1 hour under aerated condition using an electric furnace, and thus, a structural color film comprising silica, which had no defects such as cracks and the like over the entire surface and showed bright green color, as observed in the direction perpendicular to the film plane, could be obtained. When the observation direction was tilted, a color shift from green to red was observed. This film had an average film thickness of about 10 µm and a ratio L/D of the length (L) of the shortest side of the film plane to the thickness (D) of the film of 10,000.

Example 12

An off-white homogeneous aqueous coating composition was obtained by mixing 100 parts of an aqueous dispersion comprising the hollow polymer particle (Table 3) synthesized in the same manner as in Synthesis Example 1 and Synthesis Example 2, parts of a 10% aqueous maleic acid solution, and 100 parts of a solution (50%) of a silane oligomer MS-51 in isopropanol as in Example 1 and Example 9, followed by stirring it in a bath at 20° C. for 2 hours. This aqueous coating composition was coated on a glass substrate having a size of 2.5 cm×7.5 cm with a coating rod (No. 30), and the obtained composite coating film was cured at 130° C. for 30 minutes, and as a result, a good film having no cracks could be obtained.

TABLE 3

| Particle composition | Initiator | Particle diameter | Particle concentration in aqueous dispersion (%) |
|---|---|---|---|
| Poly(ACMO-GMA) | AIBA | 230 nm | 25 |
| Poly(NIPAM-GMA) | KPS | 300 nm | 20 |
| Poly(NIPAM-GMA) | KPS | 370 nm | 20 |

Notes of Table 3:

AIBA: 2,2'-Azobis(2-amidinopropane) dihydrochloride

KPS: Potassium persulfate

Figure 15:
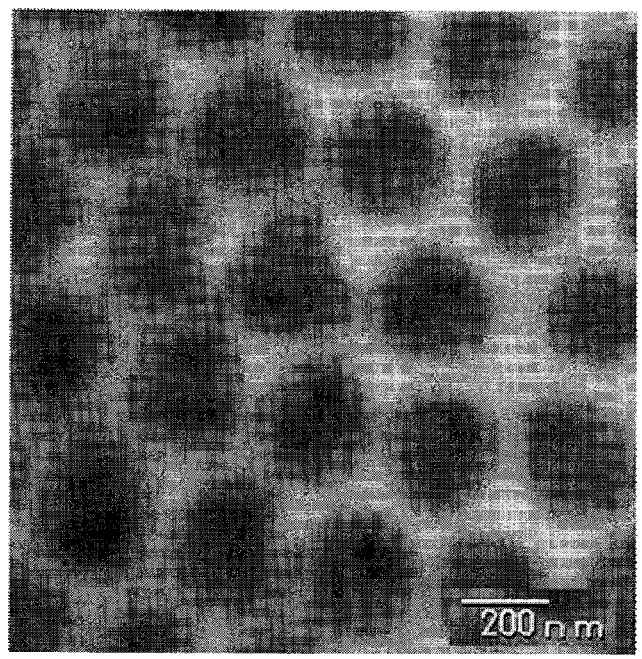
FIG. 15 is an SEM observation image showing the form of the surface of the structural color film, which was prepared using a particle having a particle diameter of 300 nm in Example 12.

The obtained coating substrate was calcined at 500° C. for 1 hour under aerated condition, and thus, a structural color film comprising of silica, which had no defects such as cracks and the like over the entire surface and showed transparent and bright color, could be obtained. When the light irradiation direction and the observation direction varied with this film, the light observed was found to vary. The reflection peak wavelengths obtained by gonio-spectrophotometry of the structural color film are shown in Table 2. When the SEM observation of the structural color film prepared using a 300 nm particle was carried out, a regular porous structure on the structural color film surface was observed (FIG. 15).

TABLE 4

| | | Reflection peak wavelengths | |
|---|---|---|---|
| Particle composition | Particle diameter (nm) | Regular reflection 10° Incidence 10° Observation | 0° Incidence 20° Observation |
| Poly(ACMO-GMA) | 230 nm | 370 nm | 400 nm |
| Poly(NIPAM-GMA) | 300 nm | 430 nm | 490 nm |
| Poly(NIPAM-GMA) | 370 nm | 500 nm | 580 nm |

Example 13

The same organic/inorganic composite coating film-coating substrate as used in Example 12 was calcined at various calcination temperatures under a nitrogen air flow, and thus, a structural color film comprising of silica, which had no defects such as cracks and the like over the entire surface and showed opaque and bright color, could be obtained. When the light irradiation direction and the observation direction varied with this film, the color observed was varied, and the color was different from those obtained by calcination under aerated condition. The reflection peak wavelengths obtained by gonio-spectrophotometry of the structural color film under each of the calcination conditions are shown in Table 5.

TABLE 5

| Particle composition | Particle diameter (nm) | Burning temperature (° C.) | | | | | |
|---|---|---|---|---|---|---|---|
| | | 400° C. | | 450° C. | | 500° C. | |
| | | 10° Incidence 10° Observation | 0° Incidence 20° Observation | 10° Incidence 10° Observation | 0° Incidence 20° Observation | 10° Incidence 10° Observation | 0° Incidence 20° Observation |
| Poly(ACMO-GMA) | 230 | 400 nm | 450 nm | 400 nm | 460 nm | 400 nm | 460 nm |
| Poly(NIPAM-GMA) | 300 | 510 nm | 560 nm | 500 nm | 570 nm | 450 nm | 540 nm |
| Poly(NIPAM-GMA) | 370 | 620 nm | 700 nm | 600 nm | 710 nm | 560 nm | 700 nm |

Figure 16:
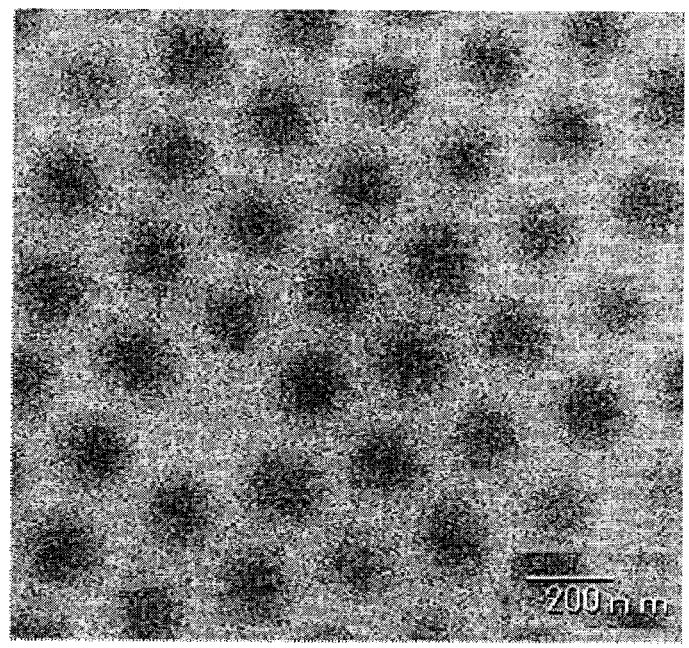
FIG. 16 is an SEM observation image showing the form of the surface of the structural color film, which was prepared using a particle having a particle diameter of 300 nm in Example 13.

When these structural color films were subjected to Raman spectrum measurements, the peaks were found at 1354 and 1548 cm$^{-1}$, which confirmed the presence of carbonized organic substances in the film. By the TG-DTA measurement, the amounts of the carbonized organic substances present after calcination at 400, 450, and 500° C. were generally 15%, 20%, and 33%, respectively. When the SEM observation of the structural color film prepared using the 300 nm particle was carried out, a regular porous structure on the structural color film surface was observed (FIG. 16).

Example 14

An off-white homogeneous aqueous coating composition was obtained by mixing 100 parts of an aqueous dispersion comprising the hollow polymer particle (Table 3) synthesized in the same manner as in Synthesis Example 1 and Synthesis Example 2, parts of a 10% aqueous maleic acid solution, and 100 parts of a solution (50%) of a mixed silica source of a silane-oligomer MS-51 and glycidoxypropyltrimethoxysilane (GPTMS) (mass ratio MS-51/GPTMS=2) in isopropanol, followed by stirring it in a bath at 20° C. for 2 hours. This aqueous coating composition was applied on a glass substrate having a size of 2.5 cm×7.5 cm with a coating rod (No. 30), and the obtained composite coating film was cured at 130° C. for 30 minutes, and as a result, a good film having no cracks could be obtained.

The obtained coating substrate was calcined at various calcination temperatures for 1 hour under aerated condition to under a nitrogen air flow, and thus, a structural color film comprising of silica, which had no defects such as cracks and the like over the entire surface and showed bright color, could be obtained. When the light irradiation direction and the observation direction varied with this film, the color observed was varied. The reflection peak wavelengths obtained by gonio-spectrophotometry of the structural color film are shown in Table 6 (calcined under aerated condition) and Table 7 (under a nitrogen air flow).

TABLE 6

| Particle composition | Particle diameter | Reflection peak wavelength Regular reflection | |
|---|---|---|---|
| | | 10° Incidence 10° Observation | 0° Incidence 20° Observation |
| Poly(ACMO-GMA) | 230 nm | 370 nm< | 400 nm |
| Poly(NIPAM-GMA) | 300 nm | 410 nm | 450 nm |
| Poly(NIPAM-GMA) | 370 nm | 500 nm | 550 nm |

TABLE 7

| Particle composition | Particle diameter (nm) | Burning temperature (° C.) | | | | | |
|---|---|---|---|---|---|---|---|
| | | 400° C. | | 450° C. | | 500° C. | |
| | | 10° Incidence 10° Observation | 0° Incidence 20° Observation | 10° Incidence 10° Observation | 0° Incidence 20° Observation | 10° Incidence 10° Observation | 0° Incidence 20° Observation |
| Poly(ACMO-GMA) | 230 | 410 nm | 510 nm | 420 nm | 470 nm | 420 nm | 500 nm |
| Poly(NIPAM-GMA) | 300 | 600 nm | 620 nm | 450 nm | 580 nm | 540 nm | 600 nm |
| Poly(NIPAM-GMA) | 370 | 650 nm | 700 nm | 600 nm | 710 nm | 580 nm | 620 nm |

Comparative Example 1

A coating liquid having the same composition as in Example 1 except that a hollow polymer particle was not used was prepared, and applied on a glass substrate with a coating rod (No. 30) to obtain a composite coating film. When it was dried at 25 and 80° C., a number of cracks are generated in the film, and the film was fell down from the substrate.

Comparative Example 2

A 20% by weight of a dispersion liquid of a core shell type fine particle having a polystyrene non-hollow core having a diameter of 250 nm and a crosslinked poly(N-isopropylacrylamide) shell layer having a thickness of 50 nm was spin coated on a glass substrate having 2.5 cm square size with rotation speed at 1000 rpm for 10 seconds to obtain a film in which the fine particles are regularly arranged in three dimensions. This film was dipped in a petri dish having a diameter of 5 cm that had been added with tetraethoxysilane for 12 hours, and a sol-gel reaction was allowed to proceed in the shell layer, and as a result, a film fixed the three dimensional periodic structure of the fine particles over the entire glass substrate was obtained. If this film was heated and calcined at 500° C., a structural color film showing a bright iridescent color could be obtained, but cracks were incorporated in the film surface and the film was peeled off in the form of a few mm wide strip.

Comparative Example 3

A 20% by weight of a dispersion liquid of a core shell type fine particle having a polystyrene non-hollow core having a diameter of 250 nm and a crosslinked poly(N-isopropylacrylamide) shell layer having a thickness of 50 nm was spin coated on a glass substrate having 5 cm square size to obtain a film in which the fine particles were periodically arranged in three dimensions with a coating rod (No. 30). If this film was dipped in a petri dish having a diameter of 10 cm added with tetraethoxysilane for 12 hours and a sol-gel reaction was allowed to proceed in the shell layer, the film was peeled off in the form of a few mm wide strip from the glass substrate surface.

Application Example 1

Figure 17:
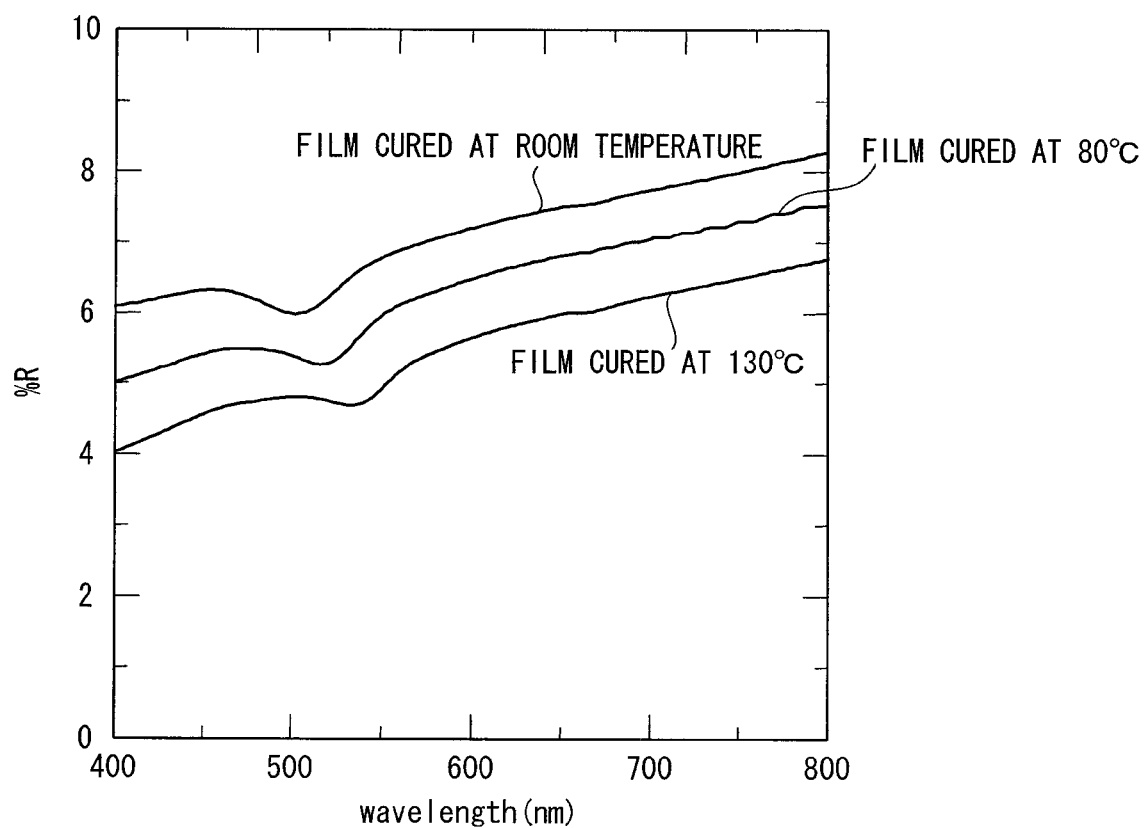
FIG. 17 is a reflection spectrum of the cured film obtained in Application Example 1.

Reflection spectra of the three kinds of coating films prepared in Example 1 (the films after curing at 25, 80, and 130° C.) were measured, and as a result, in any of the films, the peaks showed a photoresponse at 500 to 550 nm in the visible light region (FIG. 17). This phenomenon was not shown at all in a hybrid film in which holes were formed on the surface (see WO '512) or an organic/inorganic hybrid film in which the polymer particles were contained inside (see JP '089). That is, it is believed that the regular array of the hollow particles in the coating film surface and the inside of the coating film of the present invention resulted in a light reflection effect.

The composite coating film having an internal hollow structure and a surface regular peak-valley pattern, enables a conductive metal line to be constructed on the pattern surface, in addition to the semiconductor properties of the material itself, and can be expected to be applied to the field of a number of advanced materials, such as a biosensor, fixation of biomolecules/catalysts, dye-sensitized solar cells, luminescent materials due to optical interference, construction of a superhydrophobic or superhydrophilic coating film, and the like in the future.

Furthermore, the method for preparing the structural color film of the present invention is a method for easily preparing a structural color film having no defects and having a three dimensional, periodic porous structure inside on a variety of any of shapes of solid substrate, such as glass, a metal, a metal oxide, and the like, and further, it enables an self-standing film to be obtained as well as a film on a substrate. The structural color film of the present invention thus obtained or the substrate coated with the structural color film has neither cracks nor defects even though it has a large area, and shows uniform and bright color. Accordingly, it can be suitably used in the field of design/craft, decoration, and the like. Further, it can be applied to a number of fields of photonic crystals using an optical interference action, various sensors, counterfeit prevention coatings, fixation of a biomolecule/catalyst using a porous structure, dye-sensitized solar cells, fuel cells, construction of a superhydrophobic or superhydrophilic surface, heat insulation, sound insulation material, and the like.

The invention claimed is:

1. A method for preparing a structural color film, comprising:
    preparing an organic/inorganic composite coating film obtained by the steps of:
        applying an aqueous coating composition comprising a metal alkoxide (A), an aqueous dispersion of monodisperse hollow polymer particles (B), and an acid catalyst (C) onto a substrate (X), and
        curing the aqueous coating composition;
    peeling off the organic/inorganic composite coating film from the substrate (X); and
    then calcining the peeled off organic/inorganic composite coating film.

2. The method for preparing the structural color film as described in claim 1, further comprising the step of obtaining the hollow polymer particle (B) by the radical polymerization of a radical polymerizable water soluble monomer (b1) and a radical polymerizable water-insoluble monomer (b2) in an aqueous medium.

3. The method for preparing the structural color film as described in claim 1, wherein the hollow polymer particle (B) is a particle having a shell wall thickness equal to or more than 10 nm and equal to or less than 20 nm, and an average particle diameter equal to or more than 50 nm and less than 150 nm, or a particle having a shell wall thickness equal to or more than 10 nm and equal to or less than 80 nm, and an average particle diameter equal to or more than 150 nm and equal to or less than 800 nm.

4. The method for preparing the structural color film as described in claim 1, wherein the ratio (A)/(B) of the metal alkoxide (A) to the hollow polymer particle (B) to be used, in terms of a mass ratio, is in a range from 30/70 to 95/5.

5. The method for preparing the structural color film as described in claim 2, wherein the ratio (A)/(B) of the metal alkoxide (A) to the hollow polymer particle (B) to be used, in terms of a mass ratio, is in a range from 30/70 to 95/5.

6. The method for preparing the structural color film as described in claim 3, wherein the ratio (A)/(B) of the metal alkoxide (A) to the hollow polymer particle (B) to be used, in terms of a mass ratio, is in a range from 30/70 to 95/5.

* * * * *

UNITED STATES PATENT AND TRADEMARK OFFICE
CERTIFICATE OF CORRECTION

PATENT NO. : 8,486,494 B2
APPLICATION NO. : 12/530903
DATED : July 16, 2013
INVENTOR(S) : Norimasa Fukazawa et al.

Page 1 of 1

It is certified that error appears in the above-identified patent and that said Letters Patent is hereby corrected as shown below:

On the Title Page

Item 75 Inventors should read:   Norimasa Fukazawa, ~~Sakura (JP)~~ Yotsukaidou (JP)

Ren-Hua Jin, ~~Sakura (JP)~~ Tokyo (JP)

Signed and Sealed this
Twenty-eighth Day of January, 2014

Michelle K. Lee
*Deputy Director of the United States Patent and Trademark Office*